(12) United States Patent
Kim et al.

(10) Patent No.: US 10,372,894 B2
(45) Date of Patent: Aug. 6, 2019

(54) IRIS AUTHENTICATION METHOD AND DEVICE USING DISPLAY INFORMATION

(71) Applicant: SAMSUNG ELECTRONICS CO., LTD., Suwon-si, Gyeonggi-do (KR)

(72) Inventors: Moon-Soo Kim, Seoul (KR); Kwang-Sub Son, Suwon-si (KR); Ki-Huk Lee, Suwon-si (KR); Bo-Seul Jeon, Yongin-si (KR); Young-Eun Han, Seongnam-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 6 days.

(21) Appl. No.: 15/545,066

(22) PCT Filed: Mar. 6, 2015

(86) PCT No.: PCT/KR2015/002203
§ 371 (c)(1),
(2) Date: Jul. 20, 2017

(87) PCT Pub. No.: WO2016/117755
PCT Pub. Date: Jul. 28, 2016

(65) Prior Publication Data
US 2018/0012007 A1    Jan. 11, 2018

(30) Foreign Application Priority Data

Jan. 23, 2015  (KR) ................ 10-2015-0011373

(51) Int. Cl.
*G06K 9/00*    (2006.01)
*G06F 21/32*    (2013.01)
(Continued)

(52) U.S. Cl.
CPC .............. *G06F 21/32* (2013.01); *G06F 21/83* (2013.01); *G06F 21/84* (2013.01); *G06K 9/00* (2013.01);
(Continued)

(58) Field of Classification Search
CPC .......... G06F 21/32; G06F 21/83; G06F 21/84; G06F 2221/2117; G06K 9/00604;
(Continued)

(56) References Cited

U.S. PATENT DOCUMENTS 7,744,216 B1    6/2010  Uhlhorn
2003/0152252 A1*  8/2003  Kondo ............... G06K 9/00597
                                                        382/117

(Continued)

FOREIGN PATENT DOCUMENTS

CN    1924886    3/2007
EP    1 335 329    8/2003
(Continued)

OTHER PUBLICATIONS

International Search Report for PCT/KR2015/002203, dated Oct. 22, 2015, 3 pages.
(Continued)

*Primary Examiner* — Bhavesh M Mehta
*Assistant Examiner* — Ian L Lemieux
(74) *Attorney, Agent, or Firm* — Nixon & Vanderhye, P.C.

(57) ABSTRACT

An electronic device for performing iris authentication, according to various examples of the present invention, can comprise: an image sensor for outputting an image obtained by photographing an eye part; a display for displaying an iris authentication screen image; and a control unit detecting at least a partial region from the captured eye part image so as to perform iris authentication by adjusting display characteristics of the display on the basis of a result obtained by comparing the size of the detected region with the size of a region required for the iris authentication, and various examples are possible.

18 Claims, 23 Drawing Sheets

(51) Int. Cl.
*G09G 3/34* (2006.01)
*G06F 21/83* (2013.01)
*G06F 21/84* (2013.01)

(52) U.S. Cl.
CPC ..... *G06K 9/00604* (2013.01); *G06K 9/00617* (2013.01); *G09G 3/3406* (2013.01); *G06F 2221/2117* (2013.01)

(58) Field of Classification Search
CPC ...... G06K 9/00617; G06K 9/00; A61B 3/112; G09G 2320/0626; G09G 2354/00; G09G 2360/144; G09G 3/3406; G09G 5/00
See application file for complete search history.

(56) References Cited

U.S. PATENT DOCUMENTS

| | | | | |
|---|---|---|---|---|
| 2012/0075452 | A1* | 3/2012 | Ferren | G02B 13/0065 348/78 |
| 2013/0063582 | A1 | 3/2013 | Choi et al. | |
| 2013/0212655 | A1* | 8/2013 | Hoyos | G06K 9/00107 726/5 |
| 2014/0289834 | A1* | 9/2014 | Lindemann | G06Q 20/42 726/7 |
| 2015/0254508 | A1* | 9/2015 | Kimura | G06K 9/0061 382/117 |
| 2016/0117544 | A1* | 4/2016 | Hoyos | H04N 5/23219 348/78 |
| 2017/0351929 | A1* | 12/2017 | Kim | G09G 5/10 |
| 2018/0032813 | A1* | 2/2018 | Lee | G06K 9/00604 |
| 2018/0096212 | A1* | 4/2018 | Lin | H04N 5/23219 |
| 2018/0365490 | A1* | 12/2018 | Agrawal | G06K 9/00899 |

FOREIGN PATENT DOCUMENTS

| | | |
|---|---|---|
| KR | 10-2006-0057405 | 5/2006 |
| KR | 10-2014-0133762 | 11/2014 |
| WO | WO 2011-090225 | 7/2011 |
| WO | WO 2012-177542 | 12/2012 |

OTHER PUBLICATIONS

Written Opinion of the ISA for PCT/KR2015/002203, dated Oct. 22, 2015, 7 pages.
Extended Search Report dated Dec. 20, 2017 in counterpart European Patent Application No. 15879010.5.

* cited by examiner

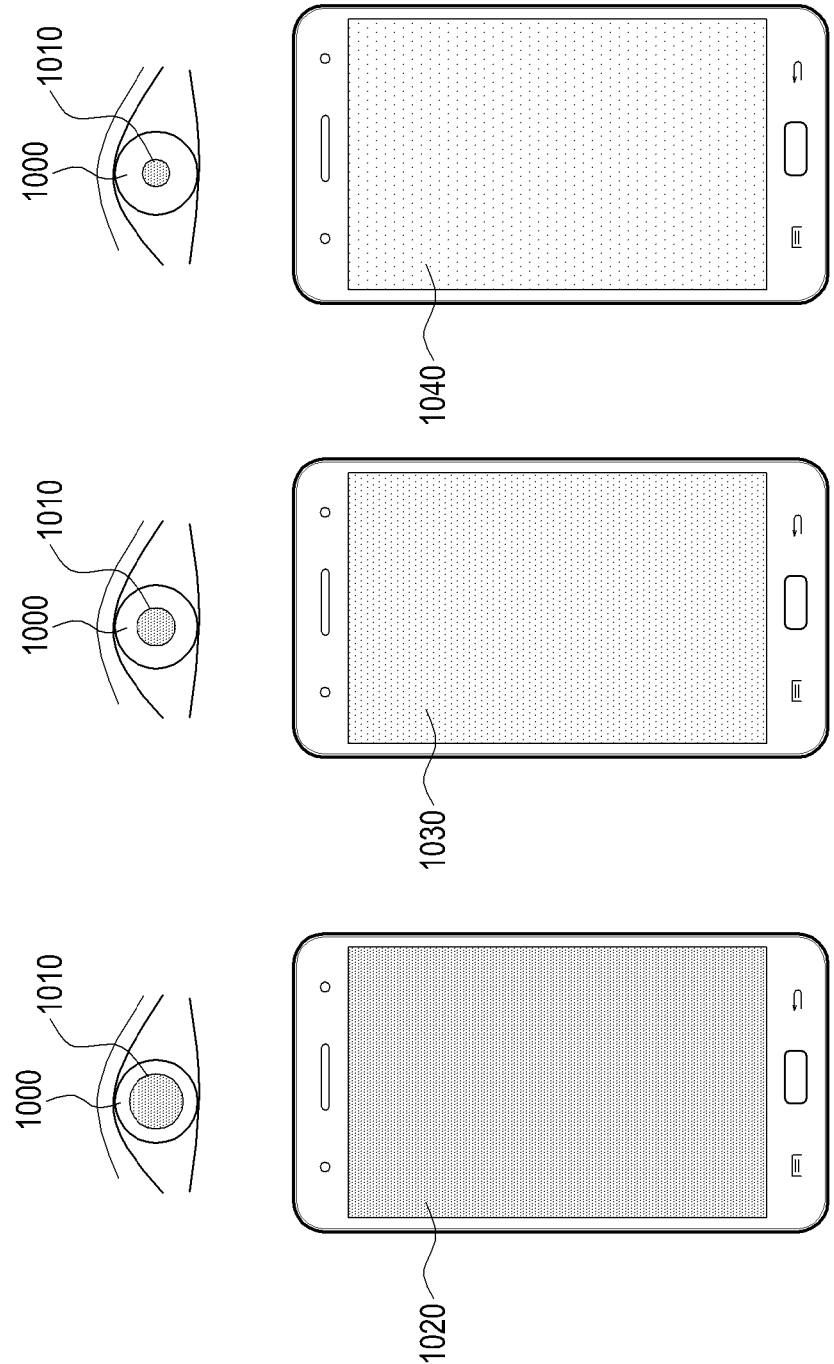

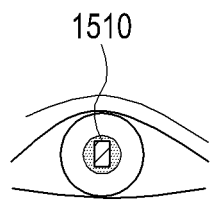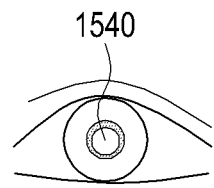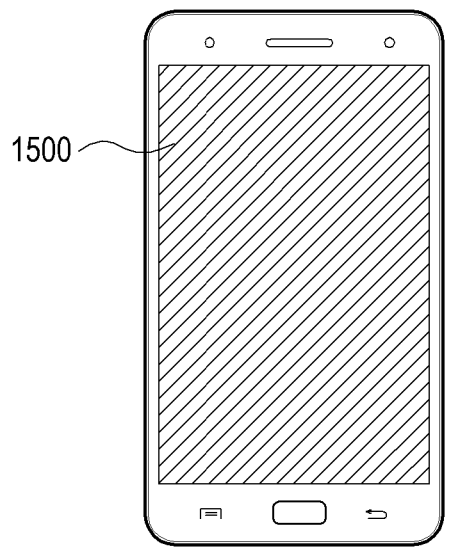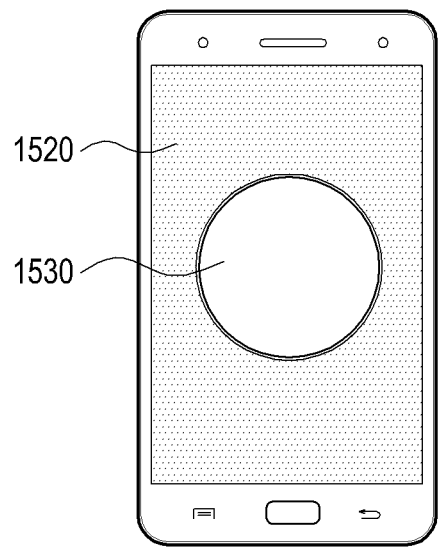
FIG.15A  FIG.15B

ID_AUTHENTICATION METHOD AND
DEVICE USING DISPLAY INFORMATION

PRIORITY

This application is a National Phase Entry of PCT International Application No. PCT/KR2015/002203, which was filed on Mar. 6, 2015, and claims a priority to Korean Patent Application No. 10-2015-0011373, which was filed on Jan. 23, 2015, the contents of which are incorporated herein by reference.

TECHNICAL FIELD

The present invention relates to a method and apparatus for performing iris authentication using a display of an electronic device.

BACKGROUND ART

In recent years, electronic devices having more various functions such as photo or video shooting, Internet communication, and the like in addition to a simple communication function are being developed. In this manner, as electronic devices have come to have various functions, personal information security is becoming more important. In particular, when personal information is stolen by others such as in financial transactions conducted over the Internet, personal information security in electronic devices having functions that can cause very serious damage is very important. As the importance of security for electronic devices increases, electronic devices have come to be equipped with various security functions to limit use by other users.

For this security, biological characteristics can be used for user identification, and research on security technologies using various types of biometric information such as fingerprints, voice, retina, face, iris, etc., is being studied. Of these various types of biometric information, human irises differ from person to person, and in particular, since the iris has a small risk of imitation and does not change much over a lifetime, security technology using irises is attracting attention.

DETAILED DESCRIPTION OF THE INVENTION

Technical Problem

In a method of recognizing a specific individual using an iris, a technique for quickly detecting a pupil and an iris is indispensable for real-time iris recognition from images obtained by photographing an eye region of a person. In addition, in order to use such iris recognition technology in a portable electronic device such as a mobile phone, it is essential to quickly detect a pupil from the images obtained by photographing the eye region in real time. However, an iris recognition rate may decrease due to variation in iris images caused by a change in a pupil size corresponding to a change in the surrounding brightness.

Accordingly, various embodiments of the present invention provide a method and apparatus for improving the accuracy of iris recognition in consideration of a pupil reacting with the brightness of light and an iris region that is changed according to the changing size of the pupil.

Technical Solution

In accordance with an aspect of the present invention, there is provided an electronic device for performing iris authentication, including: an image sensor that outputs an image obtained by photographing an eye region; a display that displays an iris authentication screen; and a control unit that detects at least a partial region from the image of the photographed eye region and performs the iris authentication by adjusting output characteristics of the display based on a result obtained by comparing a size of the detected at least the partial region with a size of a region required for the iris authentication.

In accordance with another aspect of the present invention, there is provided a method of performing iris authentication in an electronic device, including: displaying an iris authentication screen; photographing a user's eye region; detecting at least a partial region from an image of the photographed eye region; and performing the iris authentication by adjusting output characteristics of a display based on a result obtained by comparing a size of the detected at least the partial region with a size of a region required for the iris authentication.

Advantageous Effects

According to various embodiments of the present invention, since authentication is performed using an iris image having a predetermined size for authentication, the accuracy of iris recognition may be improved.

In addition, according to various embodiments of the present invention, by selecting and using an iris image having a size similar to a registered iris image for authentication, it is possible to reduce the number of objects to be compared at the time of authentication, thereby increasing the recognition speed.

BRIEF DESCRIPTION OF THE DRAWINGS

FIG. 10A to 10C are exemplary views showing a change in pupil size in accordance with display brightness according to various embodiments of the present invention;

FIGS. 15A to 15C are views for explaining iris image changes in accordance with display screens including objects according to various embodiments of the present invention;

MODE FOR CARRYING OUT THE INVENTION

Figure 1:
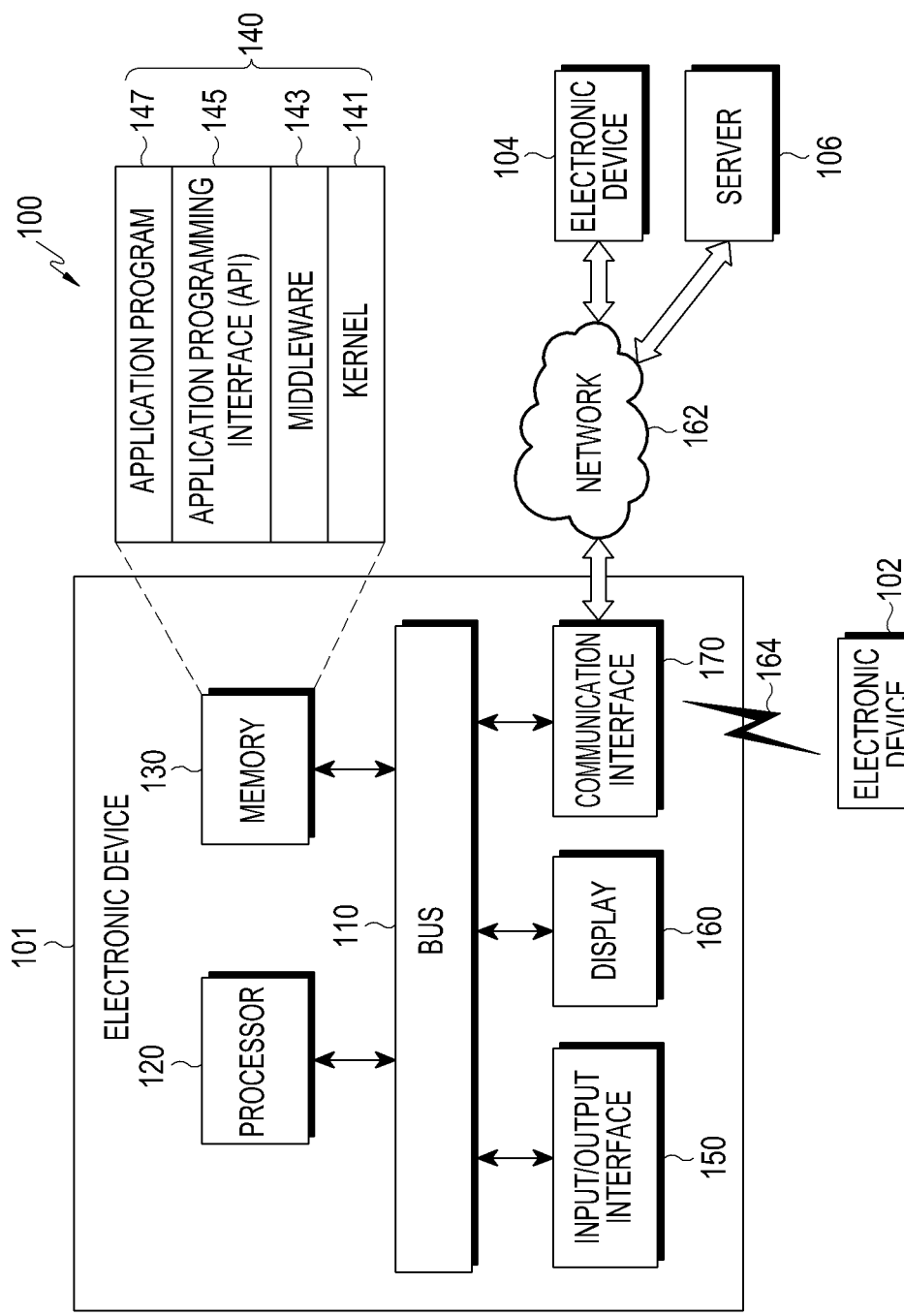
FIG. 1 illustrates a network environment including an electronic device according to various embodiments of the present invention.

Hereinafter, various embodiments of the present invention will be described with reference to the accompanying drawings. However, it should be understood that there is no intent to limit the present invention to the particular forms disclosed herein; rather, the present invention should be construed to cover various modifications, equivalents, and/or alternatives of embodiments of the present invention. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present invention may modify various components regardless of the order and/or the importance but does not limit the corresponding components. The expressions may be used to distinguish a component element from another component element. For example, a first user device and a second user device indicate different user devices although both of them are user devices. For example, a first element may be termed a second element, and similarly, a second element may be termed a first element without departing from the scope of the present invention.

When it is mentioned that one element (e.g., a first element) is "(operatively or communicatively) coupled with/ to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the present invention pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present invention should not be interpreted to exclude embodiments of the present invention.

An electronic device according to various embodiments of the present invention may be a device with an iris detection function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

In some embodiments, the electronic device may be a smart home appliance with an iris detection function. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices with an iris detection function (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure with an iris detection function, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present invention may be a flexible device. Further, the electronic device according to an embodiment of the present invention is not limited to the aforementioned devices, and may include a new electronic device according to the development of technology Hereinafter, an electronic device according to various embodiments of the present invention will be described with reference to the accompanying drawings. In the present invention, the term "user" may indicate a person using an electronic device or a device (e.g., an artificial intelligence electronic device) using an electronic device.

Referring to FIG. 1, in various embodiments, an electronic device 101 within a network environment 100 is described. The electronic device 101 may include a bus 110, a processor 120, a memory 130, an I/O (input/output) interface 150, a display 160, and a communication interface 170. In some embodiments, the electronic device 101 may omit at least one of the above-mentioned components, or may additionally include other components.

The bus 110 may include, for example, a circuit that interconnects the above-mentioned components 120 to 170 and transmits communication (e.g., control messages and/or data) between the components 120 to 170.

The processor 120 may include one or more of a CPU (central processing unit), an AP (application processor), and a CP (communication processor). The processor 120 may perform, for example, operations or data processing relating to control and/or communication of at least one other component of the electronic device 101.

The processor 120 may be referred to as a controller, or may include the controller as a part thereof.

The processor 120 according to various embodiments of the present invention may perform authentication using an iris image provided from a biometric information detection module. To this end, the electronic device 101 may further include an iris information detection module for providing the iris image, and a camera module may replace the iris information detection module.

The processor 120 may compare the iris image and an iris feature pattern registered in advance, and may regard authentication as successful and thus perform a function according to the successful authentication when the iris image has a similar iris feature pattern as the iris feature pattern registered in advance in a predetermined ratio or more. The iris image may be generated based on a pupil region in a user's face image, and the size of the iris region required for authentication may be changed because a pupil size is changed according to a change in the surrounding brightness. For example, regardless of whether a user is registered, an iris image of the user that is not good enough to be compared with a stored iris feature pattern may be obtained due to a dark room or the like at the time of obtaining the iris image of the user. However, in order to perform operations such as recognition, detection and determination of a fake iris, and the like, it is necessary to obtain an image of the iris region having a predetermined size.

For this purpose, the processor 120 according to various embodiments of the present invention may adjust the brightness of the display 160 to obtain an image of the iris region having the predetermined size in consideration of the pupil reacting with the brightness of light and the iris region that is changed according to the pupil. In this way, the processor 120 may perform recognition using an image of the iris region having a size adjusted in response to the brightness of the display 160 by adjusting the brightness of the display 160. Accordingly, an FRR (false rejection rate) may be lowered by performing recognition using the image of the iris region having the predetermined size.

The memory 130 may include volatile and/or non-volatile memory. The memory 130 may store, for example, commands or data related to at least one other component of the electronic device 101. According to an embodiment, the memory 130 may store software and/or a program 140. The program 140 may include, for example, a kernel 141, middleware 143, an API (application programming interface) 145, and/or an application program (or "application") 147. At least some of the kernel 141, the middleware 143, and the API 145 may be collectively referred to as an OS (operating system).

According to an embodiment of the present invention, the memory 130 may store iris information of at least one registered user. Here, the iris information may be stored in the form of a feature pattern of an iris image acquired for each user, and the feature pattern may be at least a part or the entirety of the feature pattern for the iris image. In addition, the memory 130 may store an iris information transformation algorithm for transforming the iris image for each user into a feature pattern such as an iris code or a template. In addition, the memory 130 may provide data to be used as a comparison reference in the authentication, and store an algorithm for this comparison. According to an embodiment of the present invention, the biometric information may include iris information.

The kernel 141 may control or manage, for example, system resources (e.g., the bus 110, the processor 120, the memory 130, etc.) used to execute operations or functions implemented in other programs (e.g., the middleware 143, the API 145, or the application program 147). Furthermore, the kernel 141 may provide an interface for allowing the middleware 143, the API 145, and/or the application program 147 to access individual components of the electronic device 101 in order to control or manage the system resources.

The middleware 143 may serve as an intermediary so that, for example, the API 145 or the application program 147 communicates with the kernel 141 to exchange data. In addition, the middleware 143 may perform control (e.g. scheduling or load balancing) with respect to operation requests received from the application programs 147 by using, for example, a method of assigning a priority for using system resources (e.g. the bus 110, the processor 120, the memory 130, and/or the like) of the electronic device 101 to one or more of the application programs 147, in connection with the operation requests.

The API 145, which is an interface for allowing the application 147 to control a function provided by the kernel 141 or the middleware 143, may include at least one interface or function (e.g., command) for file control, window control, image processing, character control, and/or the like.

The I/O interface 150 may serve as an interface capable of transmitting commands or data input from, for example, a user or other external devices to other component(s) (120 to 140 and 160 and 170) of the electronic device 101. Furthermore, the I/O interface 150 may output the commands or data received from the other component(s) (120 to 140 and 160 and 170) of the electronic device 101 to the user or the other external devices.

The display 160 may include, for example, an LCD (liquid crystal display), an LED (light-emitting diode) display, an OLED (organic LED) display, an MEMS (microelectromechanical systems) display, an electronic paper display, and the like. The display 160 may display, for example, various contents (e.g., text, image, video, icon, symbol, etc.) to a user. The display 160 may include a touch screen, and may receive a touch, gesture, proximity, or hovering input using, for example, a part of an electronic pen or a user's body.

The communication interface 170 may set, for example, communication between the electronic device 101 and an external device (e.g., a first external electronic device 102, a second external electronic device 104, or a server 106). For example, the communication interface 170 may be connected to a network 162 via wireless communication or wired communication to communicate with the external device (e.g., the second external electronic device 104 or the server 106). In addition, the communication interface 170 may set communication with the external device (e.g., the first external electronic device 102) via short-range wireless communication 164, and may be connected to the external device (e.g., the second external electronic device 104) via short-range wireless communication 164 instead of the network 162. Here, the short-range wireless communication may use at least one of, for example, a beacon, Wi-Fi direct, Bluetooth, baseband, and audible/non-audible frequencies.

The wireless communication, which serves as, for example, a cellular communication protocol, may use at least one of, for example, LTE, LTE-A, CDMA, WCDMA, UMTS, WiBro, and GSM. The wired communication may include at least one of, for example, a USB (universal serial bus), an HDMI (high definition multimedia Interface), an RS-232 (recommended standard 232), and a POTS (plain old telephone service). The network 162 may include at least one of a telecommunications network, for example, a computer network (e.g., LAN or WAN), the internet, and a telephone network.

Each of the first and second external electronic devices 102 and 104 may be the same kind of device as the electronic device 101, or may be different therefrom. According to an embodiment, the server 106 may include a group of one or more servers.

According to various embodiments, all or some of operations executed in the electronic device 101 may be executed in another electronic device or a plurality of other electronic devices (e.g. the external electronic devices 102 and 104 or the server 106). According to an embodiment, when the electronic device 101 is required to perform any function or service automatically or upon request, the electronic device 101 may request at least a portion of the functionality associated with the function or the service from other devices (e.g., the external electronic devices 102 and 104 or the server 106) additionally or in place of executing the function or the service by itself. The other electronic devices (e.g., the external electronic devices 102 and 104 or the server 106) may execute the requested function or additional function and transmit the execution result to the electronic device 101. The electronic device 101 may process the received result without change or by adding functionality thereto, and provide the requested function or service. For this, for example, a cloud-computing technology, a distributed-computing technology, or a client-server computing technology may be used.

Figure 2:
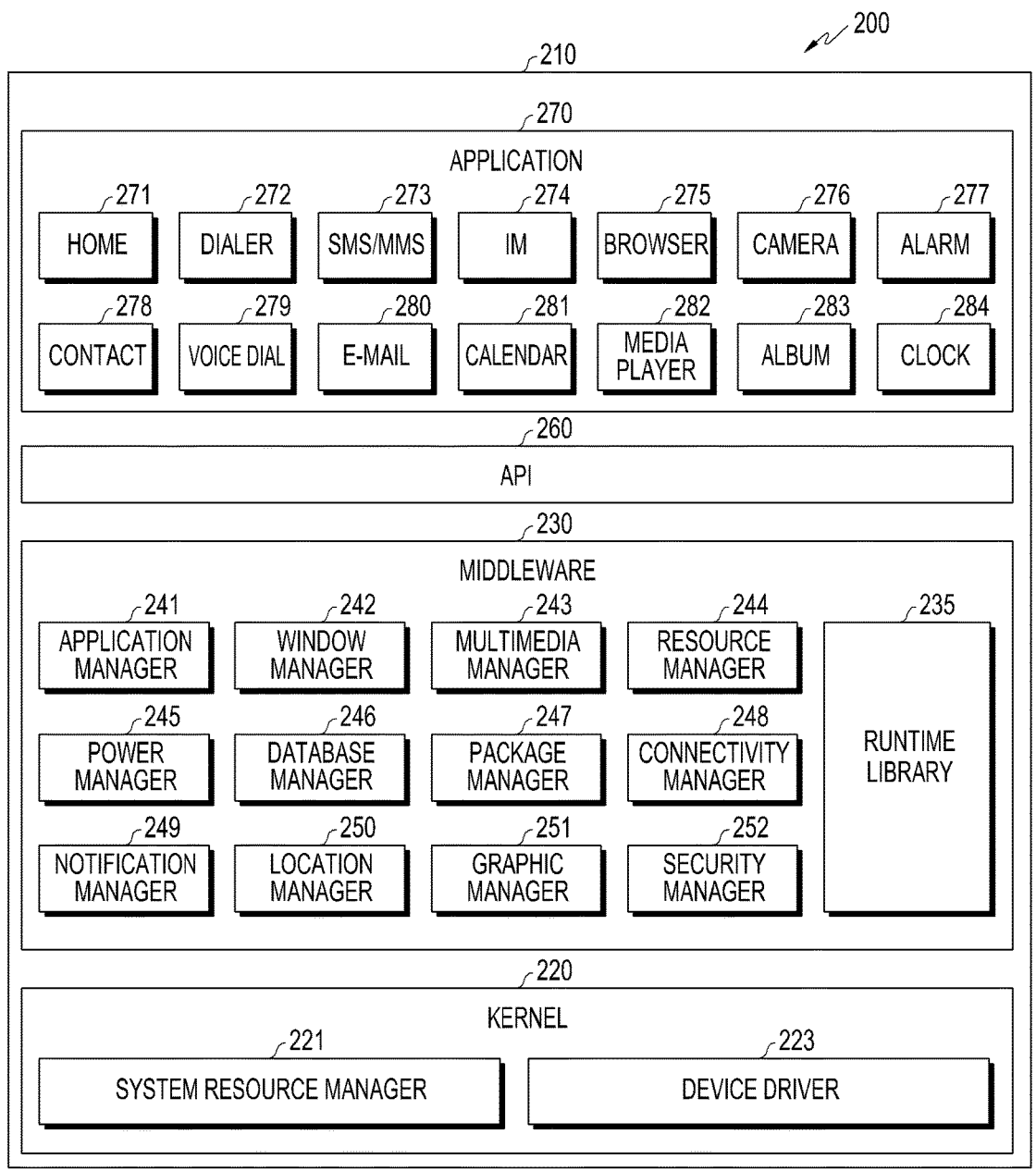
FIG. 2 is a block diagram of a program module according to various embodiments of the present invention.

FIG. 2 is a block diagram 200 of a program module 210 according to various embodiments of the present invention. According to an embodiment, the program module 210 (e.g., the program 140) may include an OS for controlling resources associated with an electronic device (e.g., the electronic device 101) and/or a variety of applications (e.g., the application program 147) driven on the OS. The OS may be, for example, Android, iOS, Windows, Symbian, Tizen, Bada, or the like.

The program module 210 may include a kernel 220, a middleware 230, an API (Application Programming Interface) 260, and/or an application 270. At least a part of the program module 210 may be preloaded on the electronic device, or may be downloaded from a server (e.g., the server 106).

The kernel 220 (e.g., the kernel 141 of FIG. 1) may include, for example, a system resource manager 221 or a device driver 223. The system resource manager 221 may perform control, allocation, recovery, or the like of the system resource. According to an embodiment, the system resource manager 221 may include a process management unit, a memory management unit, a file system management unit, or the like. The device driver 223 may include, for example, a display driver, a camera driver, a Bluetooth driver, a shared memory driver, a USB driver, a keypad driver, a Wi-Fi driver, an audio driver, or an IPC (interprocess communication) driver.

The middleware 230 may provide, for example, functions which the application 270 needs in common, or may provide various functions to the application 270 via the API 260 so that the application 270 may efficiently use the limited system resources in the electronic device. According to an embodiment, the middleware 230 (e.g., the middleware 143) may include at least one of a runtime library 235, an application manager 241, a window manager 242, a multimedia manager 243, a resource manger 244, a power manager 245, a database manager 246, a package manager 247, a connectivity manager 248, a notification manager 249, a location manager 250, a graphic manager 251, and a security manager 252.

The runtime library 235 may include, for example, a library module used by a compiler to add a new function via a programming language while the application 270 is executed. The runtime library 235 may perform input and output management, memory management, or an arithmetic function.

The application manager 241 may manage, for example, a life cycle of at least one of the applications 270. The window manager 242 may manage GUI resources used on a screen. The multimedia manager 243 may identify a format required for reproducing various media files, and may encode or decode a media file using a codec corresponding to the corresponding format. The resource manager 244 may manage source code of at least one of the applications 270 and resources of a memory or a storage space.

The power manager 245 may act with, for example, a BIOS (basic input/output system) or the like to manage a battery or a power source, and may provide power information required for the operation of the electronic device. The database manager 246 may generate, search, or change a database to be used in at least one of the applications 270. The package manager 247 may manage installation or update of an application distributed by a type of a package file.

The connection manager 248 may manage a wireless connection of, for example, Wi-Fi or Bluetooth. The notification manager 249 may display or notify events of an arrival message, an appointment, and proximity notification by a method which does not disturb the user. The location manager 250 may manage location information of the electronic device. The graphic manager 251 may manage a graphic effect to be provided to the user or a user interface related to the graphic effect. The security manager 252 may provide all security functions required for system security or user authentication. According to an embodiment, when the electronic device (e.g., the electronic device 101) has a phone function, the middleware 230 may further include a telephony manager for managing a voice or video call function of the electronic device.

The middleware 230 may include a middleware module that forms a combination of various functions of the above-described components. The middleware 230 may provide a module which is specialized for each kind of OS to provide a differentiated function. In addition, the middleware 230 may dynamically delete some of the existing components or add new components.

The API 260 (e.g., the API 145), which is a set of API programming functions, may be provided as different components depending on the OS. For example, in the case of Android or iOS, one API set may be provided for each platform, and in the case of Tizen, two or more API sets may be provided for each platform.

The application 270 (e.g., the application 147) may include, for example, one or more applications which provide functions such as home 271, a dialer 272, an SMS/MMS 273, an IM (instant message) 274, a browser 275, a camera 276, an alarm 277, a contact 278, a voice dial 279, an e-mail 280, a calendar 281, a media player 282, an album 283, a clock 284, health care information provision (e.g., measuring momentum or blood sugar), environment information provision (e.g., atmospheric pressure, humidity, temperature information, or the like), and the like.

According to an embodiment, the application 270 may include an application that supports information exchange between the electronic device (e.g., the electronic device 101) and the external electronic device (e.g., the external electronic devices 102 and 104) (hereinafter, for convenience of description, "information exchange application"). The information exchange application may include, for example, a notification relay application for relaying specific information to the external electronic device or a device management application for managing the external electronic device.

For example, the notification relay application may include a function for relaying, to the external electronic device (e.g., the external electronic devices 102 and 104), notification information generated from the other applications (e.g., the SMS/MMS application, the e-mail application, the health care application, or the environment information application) of the electronic device. In addition, the notification relay application may receive, for example, notification information from the external electronic device, and provide the received notification information to the user. The device management application may manage (e.g., install, delete, or update), for example, one or more functions (e.g., turn on/turn-off of the external electronic device itself (or some components) or adjustment of brightness (or resolution) of a display) of the external electronic device (e.g., the external electronic devices 102 and 104) communicating with the electronic device, applications operated in the external electronic device, or services (e.g., call service or message service) provided by the external electronic device.

According to an embodiment, the application 270 may include an application (e.g., a health care application) designated according to attributes (e.g., the type of the electronic device is a mobile medical device, as the attribute of the electronic device) of the external electronic device (e.g., the electronic devices 102 and 104). According to an embodiment, the application 270 may include an application received from the external electronic device (e.g., the server 106 or the electronic devices 102 and 104). According to an embodiment, the application 270 may include a preloaded application or a third-party application capable of being downloaded from the server. Names of the components of the program module 210 according to the shown embodiment may be changed depending on the OS.

According to various embodiments, at least some of the program modules 210 may be implemented in software, firmware, hardware, or a combination of two or more thereof. At least some of the program modules 210 may be implemented (for example, executed) by, for example, the processor (for example, the AP 120). At least some of the program modules 210 may include, for example, a module, program, routine, sets of instructions, or process for performing one or more functions.

Figure 3:
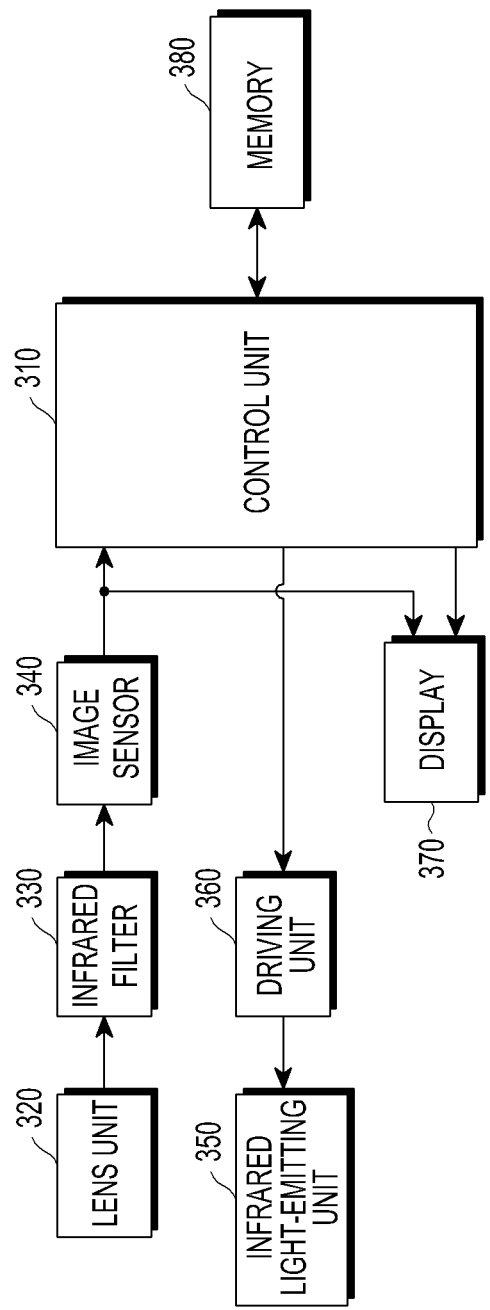
FIG. 3 is an internal block diagram of an electronic device that performs authentication by receiving iris information according to various embodiments of the present invention.

FIG. 3 is an internal block diagram of an electronic device that performs authentication by receiving iris information according to various embodiments of the present invention.

In FIG. 3, a configuration of an electronic device (e.g., the electronic device 101) including components for receiving an iris image is illustrated in order to describe the case where the biometric information is iris information, but the configuration of the electronic device (e.g., the electronic device 101) may be implemented so as to include components for receiving complex biometric information together with iris information and fingerprint information.

Referring to FIG. 3, the electronic device 101 may include a control unit 310, a lens unit 320, an infrared filter 330, an image sensor 340, an infrared light-emitting unit 350, a driving unit 360, a display 370, and a memory 380. A camera module may include the lens unit 320, the infrared filter 330, the image sensor 340, the infrared light-emitting unit 350, and the driving unit 360. According to an embodiment, the electronic device 101 may further include a module for additionally detecting biometric information other than the iris, or a module for detecting other biometric information, by replacing the camera module.

First, the camera module may process the iris image acquired for iris recognition under the control of the control unit 310 or independently thereof, so that the iris image may be displayed on the display 370. In other words, the camera module may set an iris recognition mode, control the image sensor 340 to generate an image of a subject, that is, an image obtained by photographing a user's face, and detect an image region including at least a part of the iris, for example, an iris region, from the generated image.

In addition, the camera module may determine guide information corresponding to the iris region detected under the control of the control unit 310 and provide the determined guide information to a user. The guide information may be information for guiding the appropriate position of the iris to the user in an image used for iris recognition. In addition, the camera module may apply a predetermined image effect to the iris region detected under the control of the control unit 310 to generate an image to which the image effect is applied, and display the generated image on the display 370. The image effect may be image processing that makes it possible to identify only the type of the detected iris region.

Specifically, the lens unit 320 of the camera module may adjust a focal point of the lens to a predetermined set value in response to an infrared photographing control signal by the control unit 310, and transmit optical signals reflected from a subject (not shown). The lens unit 320 may receive light for inputting a user's iris, and the light incident on the lens unit 320 may reach a band-pass filter. According to various embodiments of the present invention, the infrared filter 330 may be an example of the band-pass filter.

The infrared filter 330 may pass the optical signal of an infrared region, out of the optical signals reflected from the subject (not shown) incident through the lens unit 320. The infrared filter 330 may be arranged at a rear end of the lens so as to allow a wavelength of a specific band from the incident light to pass therethrough. The infrared filter 330 may correspond to a wavelength band including at least a part of a wavelength band emitted through the infrared light-emitting unit 350. For example, the optical signal having the wavelength of the specific band, passing through the infrared filter 330, may reach the image sensor 340. According to another embodiment, the camera module may not include the infrared filter 330. The light emitted from the infrared light-emitting unit 350 may be reflected by the iris and may be directly incident on the image sensor 340 through the lens unit 320 of the camera module.

An infrared light-emitting unit 350 (e.g., IRED: Infrared Emitting Diode) may be turned on or off by the driving unit 360 in response to the infrared photographing control signal from the control unit 310. When the infrared light-emitting unit 350 (e.g., IRED) is turned on, it is possible to irradiate a subject with light of a specific wavelength band, that is, light in an infrared band. The infrared photographing control signal may be a signal for infrared photography of the iris.

The image sensor 340 may convert an optical signal transmitted through the lens unit 320 and received into image signals and output the image signals during normal photographing, and may convert the optical signal of the infrared region, which has passed through the infrared filter 330, out of the optical signals transmitted through the lens unit 320, into infrared image signals to output the infrared image signals during infrared photographing. Accordingly, an optical image formed by the infrared ray reflected from the subject may be converted into a digital image to output the digital image. Here, the camera module may be arranged in the electronic device 101, or may be arranged at an independent position remote from the electronic device 101. The display 370 may include a touch screen or the like, and may provide a user interface corresponding to iris photography. Further, when the display 370 is a touch screen, a fingerprint sensor may be further arranged to be contacted by a user's body, for example, a fingerprint. In addition, according to various embodiments of the present invention, the display 370 may display a preview screen for iris photography under the control of the control unit 310, and may display a recognition performance screen using an iris authentication result. For example, when the iris authentication is successful, functions such as unlocking, application execution, data transmission, etc., are executed, and the display 370 may display a screen according to the function execution.

According to an embodiment, the display 370 may output brightness corresponding to a control signal for adjusting brightness corresponding to the size of the iris detected under the control of the control unit 310. In addition, when at least one parameter of a brightness, a chroma, and a contrast of a corresponding image is adjusted under the control of the control unit 310, the display 370 may display a changed image.

The memory 380 may store iris information of at least one registered user. Here, the iris information may be stored in the form of a feature pattern of an iris image acquired for each user, and the feature pattern may be at least a part or the entirety of the feature pattern for the iris image. In addition, the memory 380 may store an iris information transformation algorithm for transforming the iris image for each user into a feature pattern such as an iris code or a template. In addition, the memory 380 may provide data to be used as a comparison reference in the authentication, and may store an algorithm for this comparison.

In addition, the memory 380 may map and store object information displayed on a screen at the time of iris registration of the user under the control of the control unit 310. In addition, the memory 380 may map and store a command for executing an application on the object under the control of the control unit 310.

The control unit 310 may detect at least a partial region from a photographed eye region image. Here, the at least a partial region may include pupil and iris regions of the eye region image. The control unit 310 may perform iris authentication by adjusting output characteristics of the display based on a result of comparing a size of the detected region and a size of a region required for the iris authentication. At this time, the output characteristics of the display may include the brightness of the display 370, and may be adjusted by changing at least one of a brightness, a chroma, and a contrast of an image displayed on the display.

When the size of the pupil region is larger than the size of the region required for the iris authentication, the control unit 310 may increase the brightness of the display 370. At this time, the brightness of the display 370 may be increased to correspond to a ratio of a size of the pupil region to a size of the iris region. Specifically, the control unit 310 may detect the pupil region in an eye image acquired through the image sensor 340, and may adjust the output characteristics of the display 370 in order to obtain iris information having the iris region having a size required for iris authentication in the pupil region. Next, the control unit 310 may control the output characteristics of the display 370, for example, the extent to which the brightness is to be increased when the pupil increases to a predetermined size or larger in accordance with the adjustment of the output characteristics of the display 370. When the iris region having a desired size is obtained by adjusting the output characteristics of the display 370, iris information (an iris template, an iris code, etc.) of the user stored in the memory 380 for authentication of the image of the iris may be compared with the iris image, thereby recognizing the iris of the user.

The control unit 310 according to various embodiments of the present invention may perform an operation of comparing the iris information and object information with pre-stored information at the time of acquiring an image including the object information registered together with the iris information of the user. When the authentication of the iris information and the object information is successful as a result of the comparison, the user authentication may be completed. In the case where an application execution command is mapped on the object information, when the authentication is successful, an application may be executed corresponding to the object information.

FIGS. 4A to 4D are front perspective views of an electronic device according to various embodiments of the present invention.

Figure 4A:
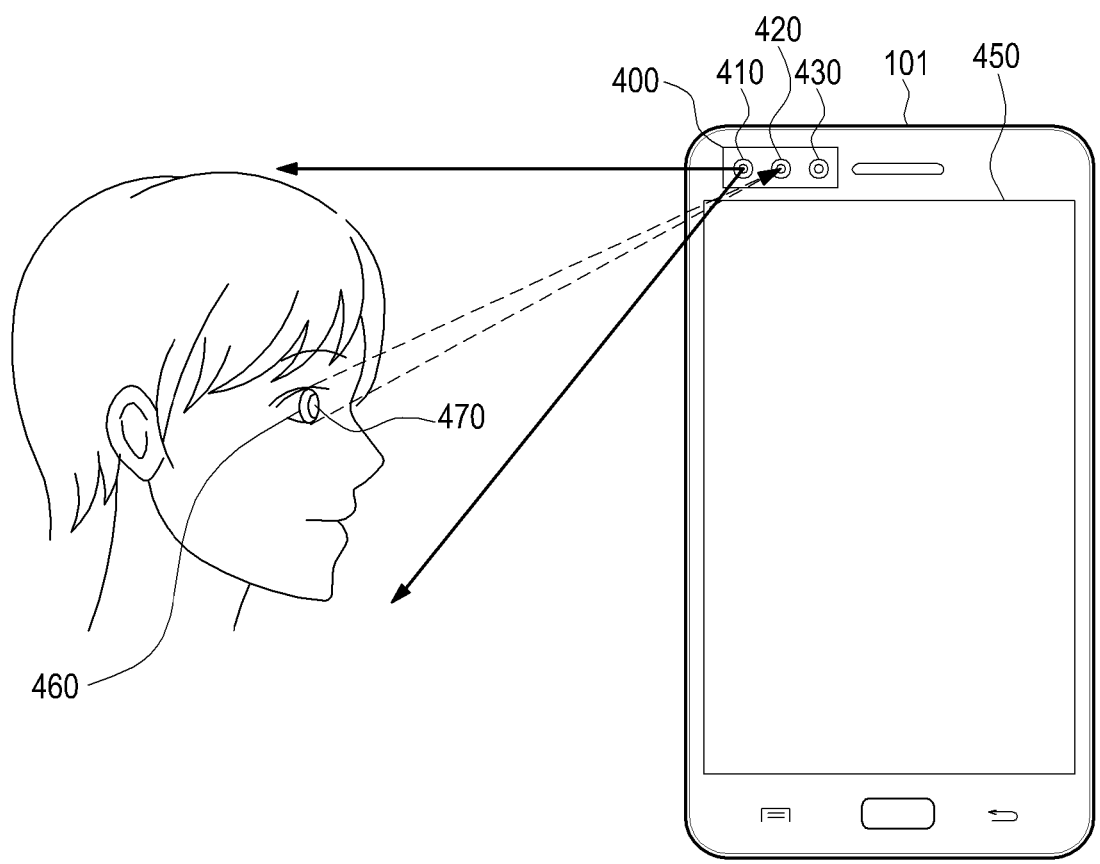
FIGS. 4A to 4D are front perspective views of an electronic device according to various embodiments of the present invention.

Referring to FIG. 4A, a camera module 400 including at least one of an infrared light-emitting unit 410 (e.g., IRED), an infrared camera (iris camera) 420, and a front camera 430 may be arranged at a bezel position surrounding a display 450 of the electronic device 101. Referring to FIG. 4A, the infrared light-emitting unit 410 (e.g., IRED) may irradiate an eye 460 of a user's face with infrared rays, and the infrared camera 420 may photograph the eye 460 to output an image of an iris 470.

Figure 4B:
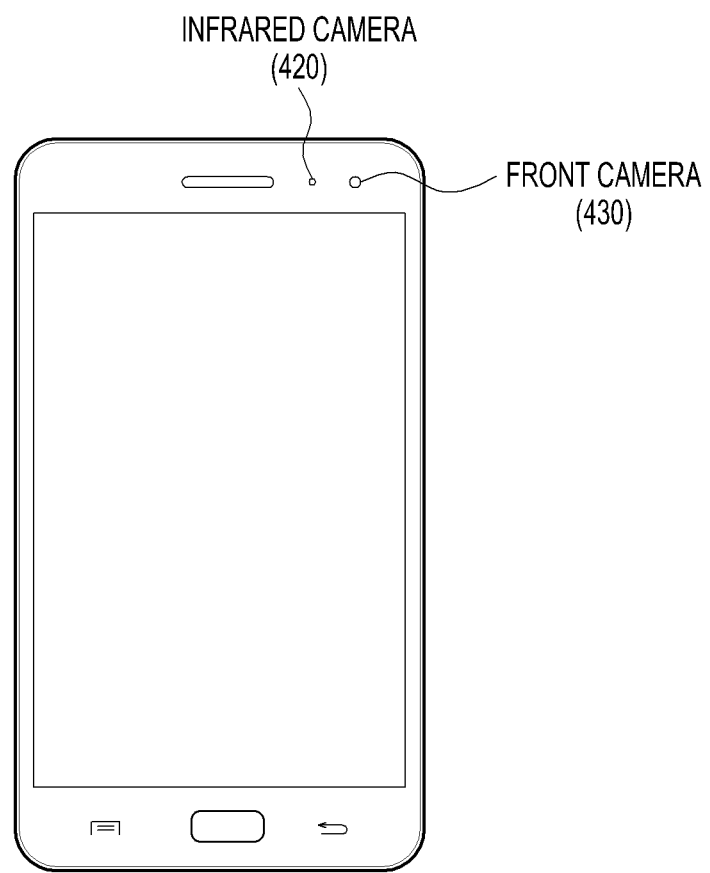

In FIG. 4A, the case in which the infrared light-emitting unit 410 (e.g., IRED), the infrared camera 420, and the front camera 430 are arranged at positions adjacent to one another in an upper end portion of the front surface of the electronic device 101 is illustrated, but, as shown in FIG. 4B, the infrared camera 420 and the front camera 430 may be arranged side by side at one side. At this time, the infrared camera 420 may be configured to include an infrared light-emitting unit.

According to an embodiment, the camera module 400 may not include the infrared light-emitting unit 410 (e.g., IRED). When the infrared rays are not used, the camera module 400 may not include the infrared light-emitting unit 410 (e.g., IRED).

Figure 4C:
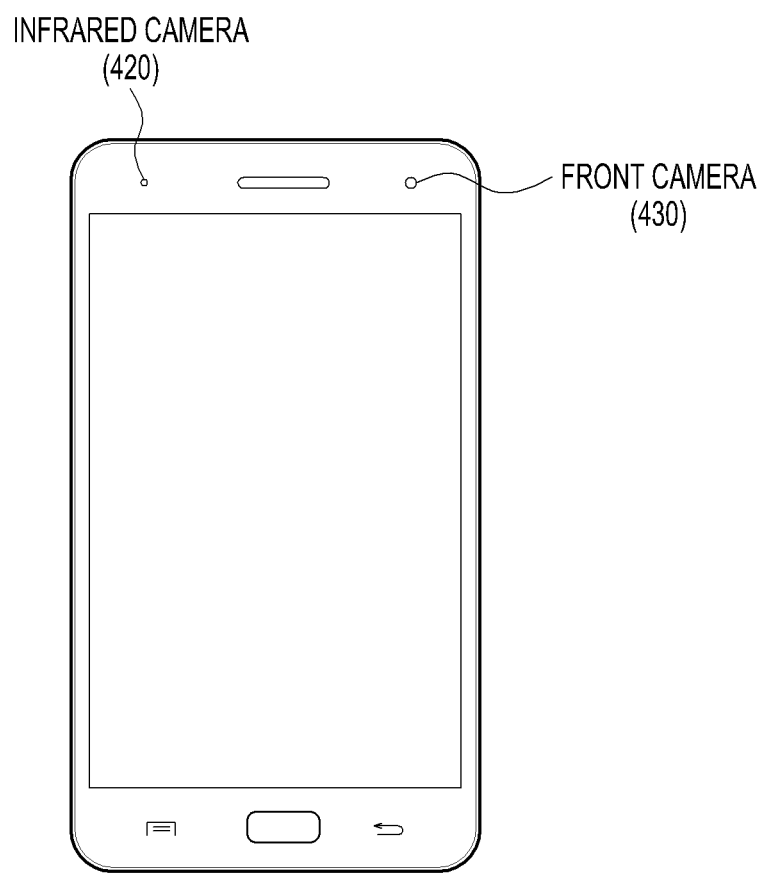
Figure 4D:
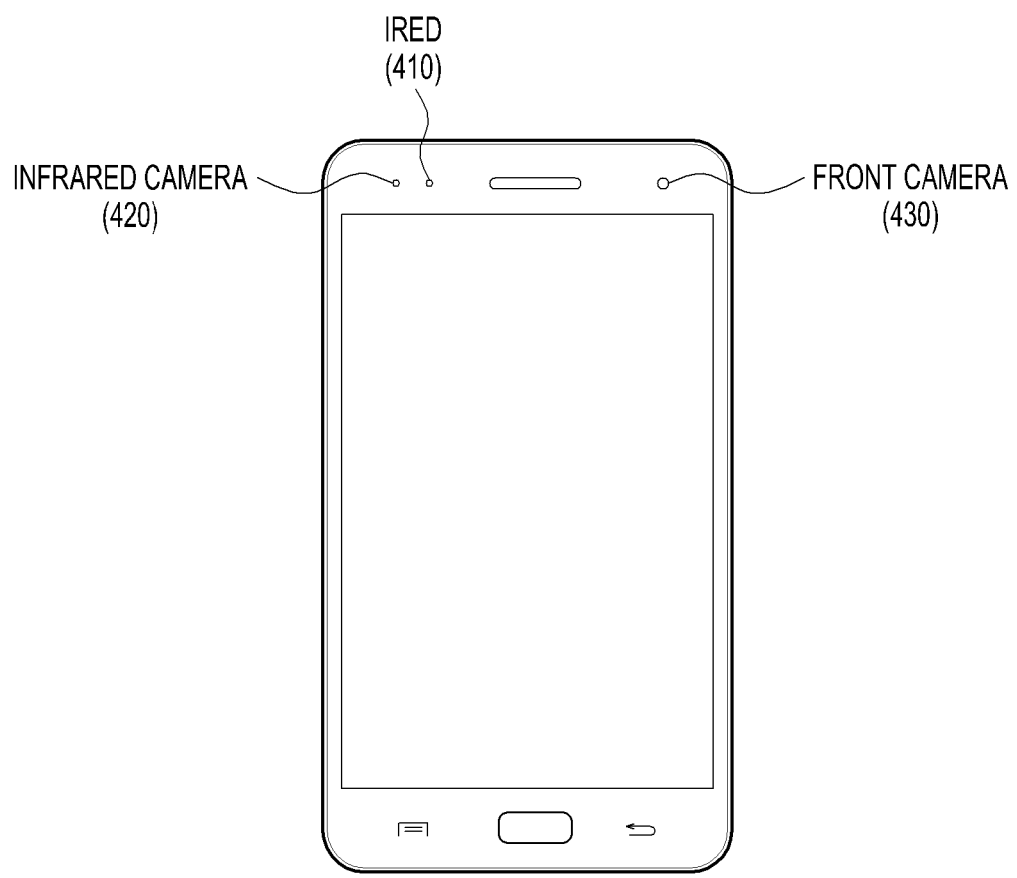

In addition, according to an embodiment, the infrared camera 420 and the front camera 430 may be arranged to be spaced apart from each other by a predetermined distance with a receiver interposed therebetween due to reasons such as spatial constraints in the electronic device 101, as shown in FIG. 4C. In addition, according to an embodiment, the infrared light-emitting unit 410 (e.g., IRED) may be arranged between the infrared camera 420 and the front camera 430 as shown in FIG. 4D.

In this manner, the arrangement positions of the infrared light-emitting unit 410 (e.g., IRED), the infrared camera 420, and the front camera 430 may be modified or changed at any time as long as at least one of the infrared light-emitting unit 410 (e.g., IRED) and the infrared camera 420 can be coupled to a main body of the electronic device 101 so as to receive a biometric image for a subject.

Meanwhile, in FIGS. 4A to 4D, the arrangement position of the camera module in a smartphone-type electronic device 101 is illustrated, but the arrangement position of a camera module of a wearable-device-type external electronic device 102 may be modified or changed at any time as long as an image of a subject, that is, an eye, can be photographed.

Figure 5:
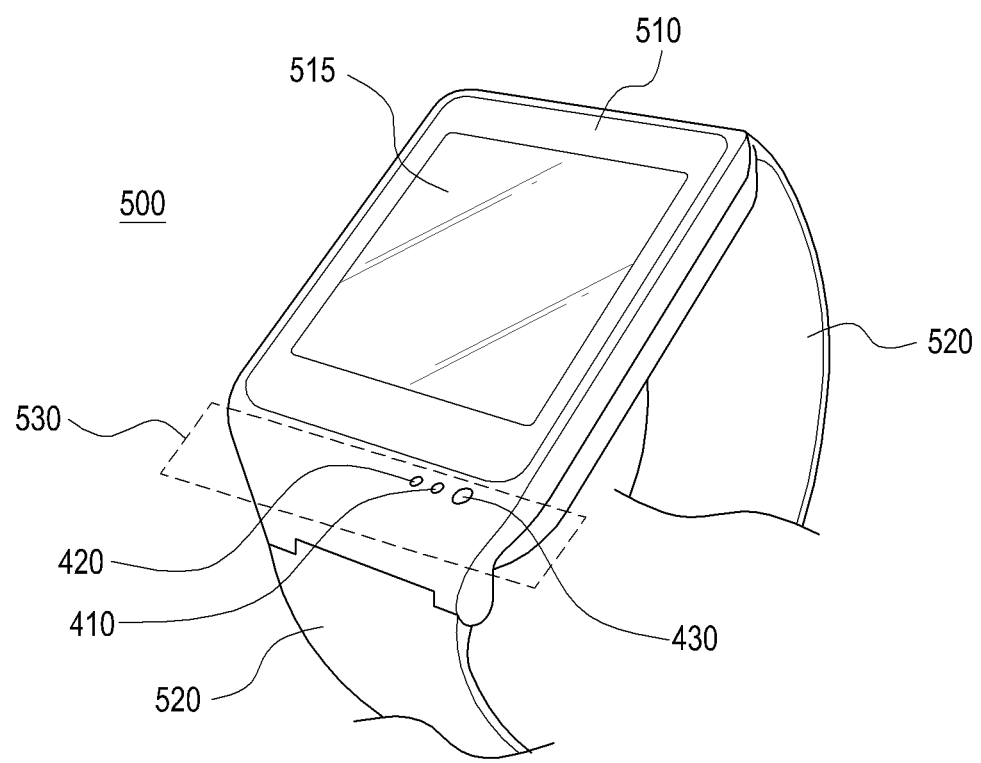
FIG. 5 is a perspective view showing a watch-type body-mounted electronic device according to various embodiments of the present invention.

FIG. 5 is a perspective view showing a watch-type body-mounted electronic device according to various embodiments of the present invention.

FIG. 5 illustrates a wearable electronic device 500 (e.g., the first external electronic device 102 of FIG. 1) that can be worn on the wrist, such as a watch or a bracelet. The wearable electronic device 500 may include a main body 510 and a strap portion 520.

The various embodiments of the present invention are not limited thereto, and the electronic device according to various embodiments of the present invention may be implemented in various communication devices or auxiliary medical devices. In addition, the electronic device according to various embodiments of the present invention may be applied variously to body portions where a curvature exists in a user's body. As examples of the body portions where a curvature exists in a user's body, a wrist, a cuff, an ankle, etc., may be given. Further, the electronic device according to various embodiments of the present invention may be conveniently worn on various portions of the user's body, depending on the shape of the wearing portion.

As described above, the wearable electronic device 500 according to various embodiments of the present invention may be collectively referred to as a wearable electronic device such as a general analog watch or a digital watch worn on a user's wrist, a smart watch, a biometric information measuring device, and the like. The main body 510 of the wearable electronic device 500 may include a watch module of an analog watch or a digital watch, a module having a display and various multi-functions, or a module for detecting a biological signal. In addition, the main body 510 of the wearable electronic device 500 may include a display 515, and the display 515 may also be utilized as an input device by incorporating a touch panel.

At least one of the infrared light-emitting unit 410 (e.g., IRED), the infrared camera 420, and the front camera 430 may be arranged at a bezel position surrounding the display 515 in the wearable electronic device 500. In FIG. 5, the case in which the infrared light-emitting unit 410 (e.g., IRED), the infrared camera 420, and the front camera 430 are arranged in a lower end portion 530 of the front surface of the main body 510 is illustrated, but the arrangement positions thereof are not limited thereto.

Figure 6:
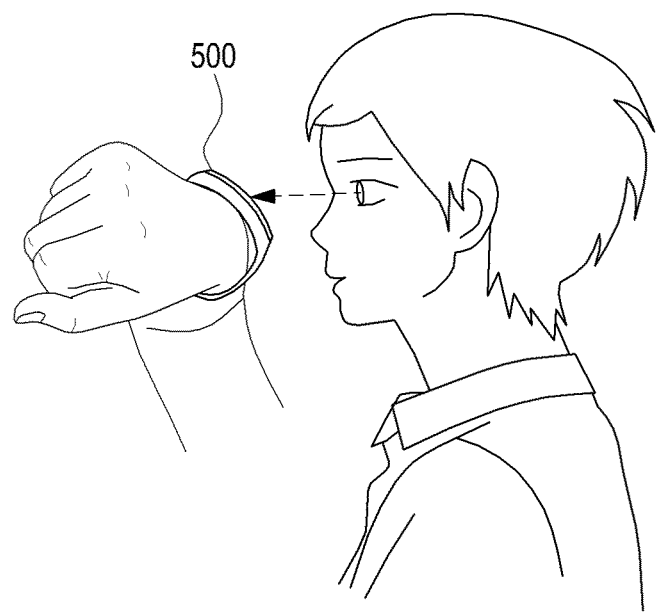
FIG. 6 is an exemplary view showing an iris authentication method using a body-mounted electronic device according to various embodiments of the present invention.

FIG. 6 is an exemplary view showing an iris authentication method using a body-mounted electronic device according to various embodiments of the present invention.

Referring to FIG. 6, an operation in which a user lifts his or her hand and brings it close to his or her face in the state of wearing the wearable electronic device 500 on his or her wrist, and then photographs his or her eye without contact between the eye and the wearable electronic device 500 is illustrated. In addition, a notification sound, a guidance voice, a haptic effect, etc., may be output to guide, for example, an iris photographing position, adjustment of the distance between the wearable electronic device 500 and the user's eye, and the like, so that the user can easily photograph his or her eye while viewing the display 515 of the wearable electronic device 500. In addition, according to various embodiments of the present invention, the wearable electronic device 500 may output the guidance while adjusting the brightness of the display 370 so as to obtain an image having a pupil size required for iris authentication.

Figure 7:
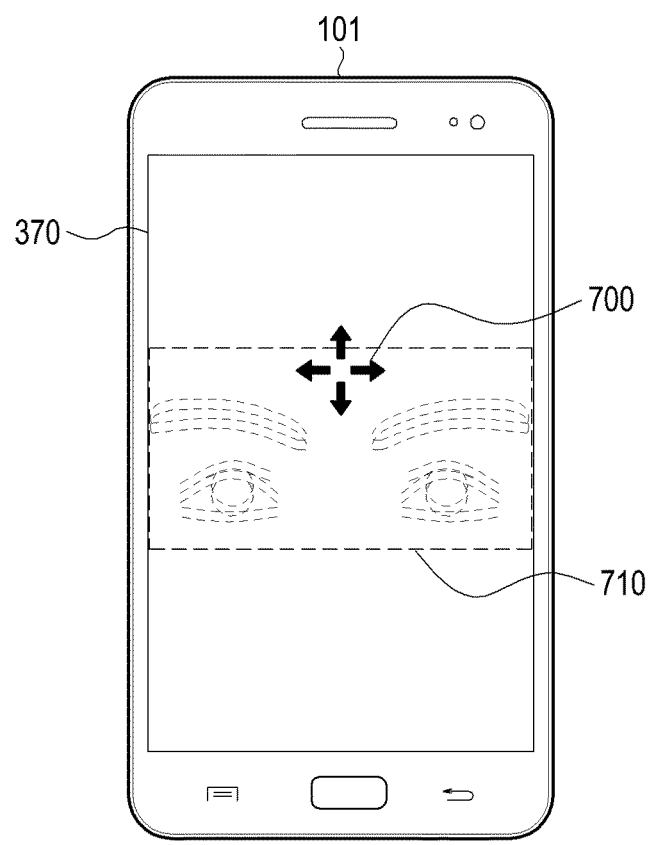
FIG. 7 illustrates a guidance screen for adjusting an iris image photographing position according to various embodiments of the present invention.

FIG. 7 illustrates a guidance screen for adjusting an iris image photographing position according to various embodiments of the present invention.

Referring to FIG. 7, according to an embodiment, the electronic device 101 may acquire an image including at least a part of a user's iris on which infrared rays emitted from the electronic device 101 are reflected, using a camera for iris recognition. The electronic device 101 according to another embodiment may acquire an image including at least a part of the user's iris on which the surrounding visible rays are reflected, using a camera provided on the front surface of the electronic device 101. In addition, the electronic device 101 may include the display 370 capable of displaying the acquired image, and the display 370 may display the acquired images in real time.

The user may guide his or her iris to a photographing reference position using the preview image displayed in real time. Further, the electronic device 101 may display, on the display 370, guide contents for guiding the user's iris to be located at the photographing reference position.

As shown in FIG. 7, when a photographed region is not located at the reference position, a face image having a blurry out-of-focus iris may be displayed. In addition, since the photographing should be performed with respect to the eye, the guide contents may be displayed on the display 370 in the form of an indicator 700 for adjusting a photographing position or a guide line 710 indicating a photographed region. In FIG. 7, the case in which information for guiding the photographing position to be adjusted is displayed in the form of the directional indicator 700 or the guide line 710 is illustrated, but in order to guide the position where the eye should be located, guidance information may be displayed in various forms such as a guide message, a cross-shaped icon, etc.

Figure 8:
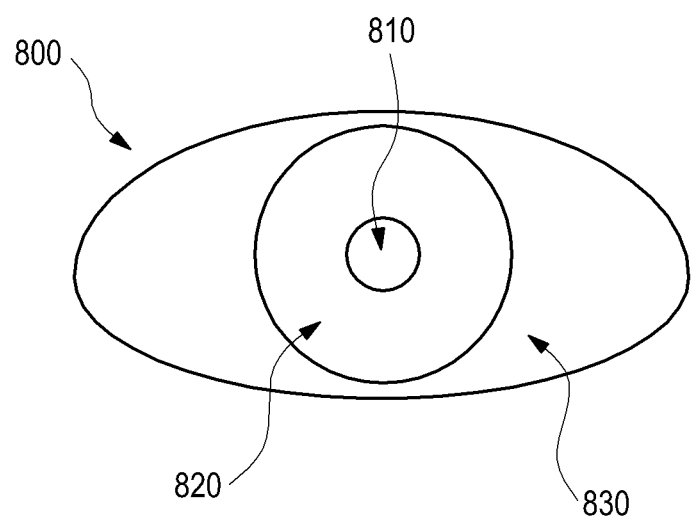
FIG. 8 is a view for explaining an iris authentication mode according to various embodiments of the present invention.

FIG. 8 is a view for explaining an iris authentication mode according to various embodiments of the present invention.

Referring to FIG. 8, a user's eye 800 may have a pupil 810, an iris 820, and a sclera 830, and the infrared light-emitting unit 410 (e.g., IRED) may irradiate the user's eye 800 with infrared rays, and the infrared camera 420 may photograph the user's eye 800 and output an iris image.

An iris recognition technology for outputting the iris image as described above is a technology for authenticating a user using a donut-shaped iris pattern existing between a central black pupil and the sclera (the white of the eye) in a human eye. One person's iris has 266 measurable characteristics, and the probability that different people's irises are the same is about $1/10^{78}$, which is the most discriminating biometric authentication technology known so far. In addition, the shape of a person's iris is determined during about 18 months after the person is born and the iris is protected by the eyebrows, eyelids, and retinas, so that the person's iris may be evaluated as having higher consistency than other biological characteristics such as fingerprints, voices, facial expressions, and signatures in that the shape of the iris does not change easily throughout its life.

Figure 9A:
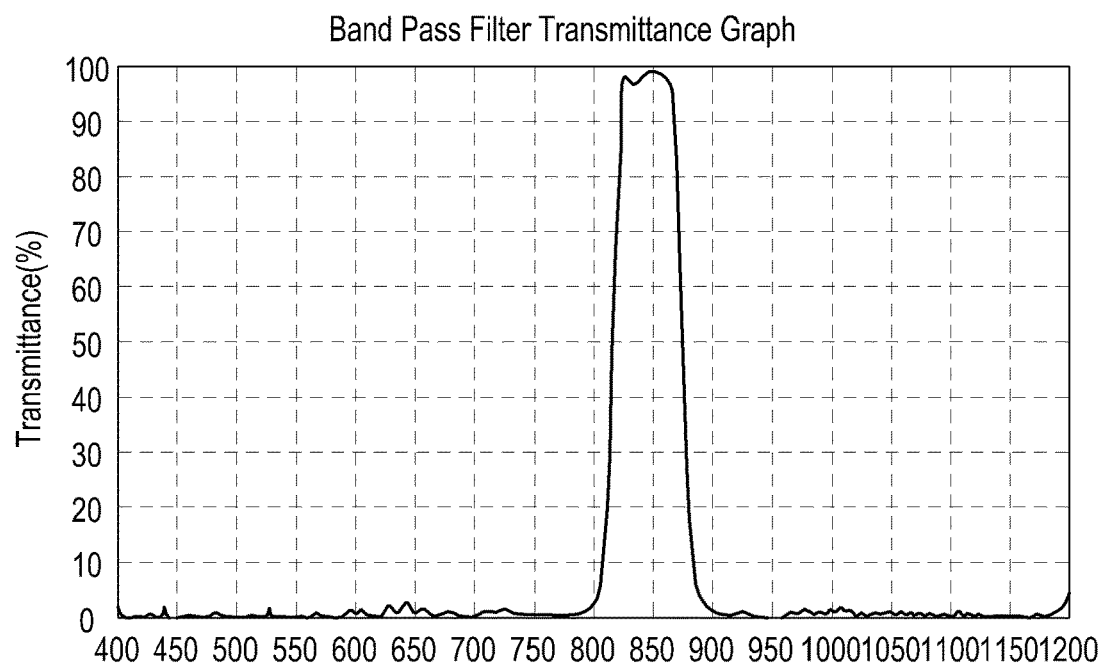
FIGS. 9A and 9B are views for explaining an operation relationship between an infrared-light-emission pulse and an image sensor according to various embodiments of the present invention.
Figure 9B:
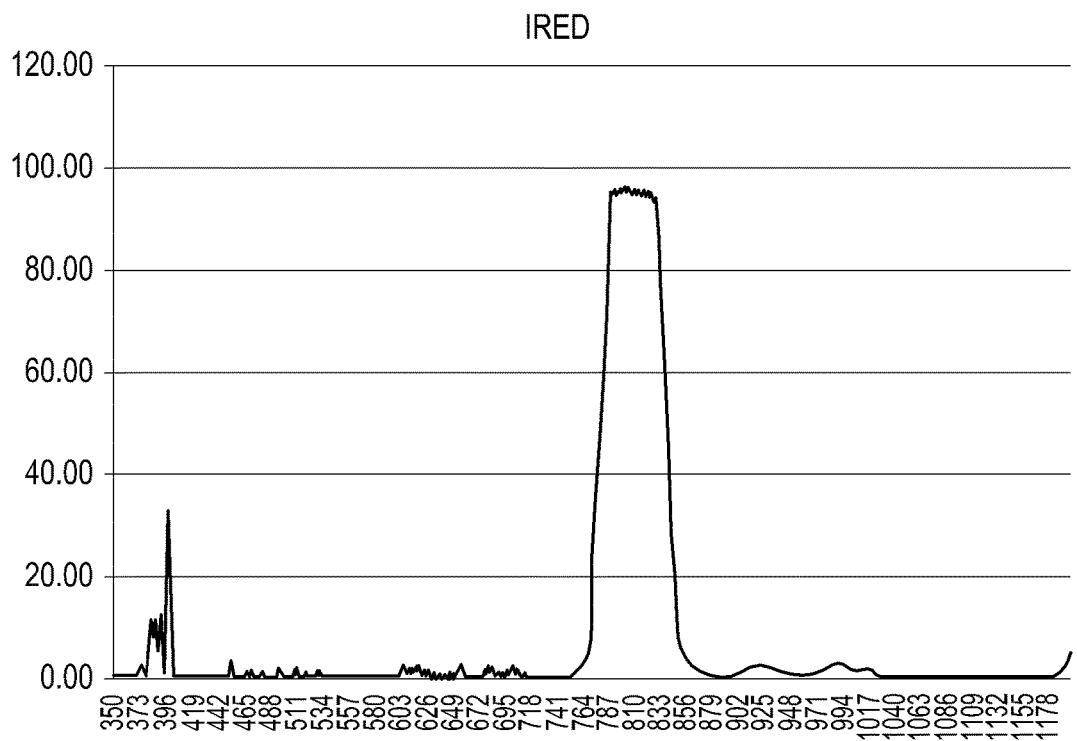

FIGS. 9A and 9B are views for explaining an operation relationship between an infrared-light-emission pulse and an image sensor according to various embodiments of the present invention.

In FIGS. 9A and 9B, according to various embodiments of the present invention, the position where actual infrared rays are emitted most brightly corresponding to the timing of an infrared-light-emission pulse is shown. Referring to FIGS. 9A and 9B, infrared rays of a specific wavelength band are emitted through the infrared light-emitting unit 350 (e.g., IRED) included in the electronic device 101, and thus the reflected light may be received by the image sensor 340. At this time, a camera may include a band-pass filter having a wavelength band including at least a part of the specific wavelength band emitted through the infrared light-emitting unit 350 (e.g., IRED), and an example of the band-pass filter may be the infrared filter 330.

Therefore, an optical signal of the specific wavelength band, that is, an infrared region, may be passed through the infrared filter 330, and the optical signal may be converted into a digital signal by the image sensor 340. The infrared filter 330 may receive and pass only light having a specific frequency, as shown in FIG. 9B. For example, when the infrared light-emitting unit 350 (e.g., IRED) emits light with a wavelength band of 850 nm±50 nm, the infrared filter 330 may selectively receive the light with the wavelength band emitted by the infrared light-emitting unit 350 (e.g., IRED) using a filter capable of passing the wavelength band of 850 nm±50 nm including a central wavelength band of the infrared light-emitting unit 350 (e.g., IRED), so that it is possible to prevent malfunctions due to the presence of light in other infrared wavelength bands in the vicinity.

FIGS. 10A to 10C are exemplary views showing a change in a pupil size in accordance with display brightness according to various embodiments of the present invention.

FIG. 10A illustrates that a user's pupil becomes relatively large when the brightness of a display 1020 of the electronic device 101 is dark and the surrounding environment is also dark. In this way, when the brightness of the display 1020 and the surrounding environment are dark, a user's pupil 1010 may have a size relatively larger than the size of the pupil in normal brightness due to contraction of an iris 1000 in order to receive a large amount of light. At this time, as the brightness of the display 1020 becomes darker, the iris 1000 contracts further and the pupil 1010 becomes larger, so that iris recognition may not be properly performed due to the excessively contracted iris 1000. In addition, since a large amount of iris information is required at the time of initial registration of iris information, sufficient iris information may not be obtained because the iris region is relatively small when the surroundings are dark.

FIG. 10B illustrates a changed pupil size when the brightness of a display 1030 is adjusted to be brighter compared to FIG. 10A. As shown in FIG. 10B, a size of an iris region 1000 may be adjusted by adjusting the brightness of the display 1030 as shown in FIG. 10B. That is, when the brightness of the display 1030 increases, the size of the pupil 1010 becomes relatively smaller as the iris 1000 is expanded.

FIG. 10C illustrates a changed pupil size when the brightness of a display 1040 is adjusted to be brighter compared to FIG. 10B. As shown in FIG. 10C, when the brightness of the display 1040 increases, the size of the pupil 1010 becomes smaller as the iris region 1000 becomes larger.

As shown in FIGS. 10A to 10C, the pupil size is changed according to the brightness change of the displays 1020, 1030, and 1040 of the electronic device 101, and the size of the iris region is also changed. According to various embodiments of the present invention, the size of the iris region may be adjusted by adjusting the brightness of the display to obtain the iris region having a size required for iris authentication. Accordingly, the electronic device 101 may perform authentication using an iris image having the iris region adjusted to have a predetermined size for authentication, so that the accuracy of iris recognition may be improved.

Figure 11:
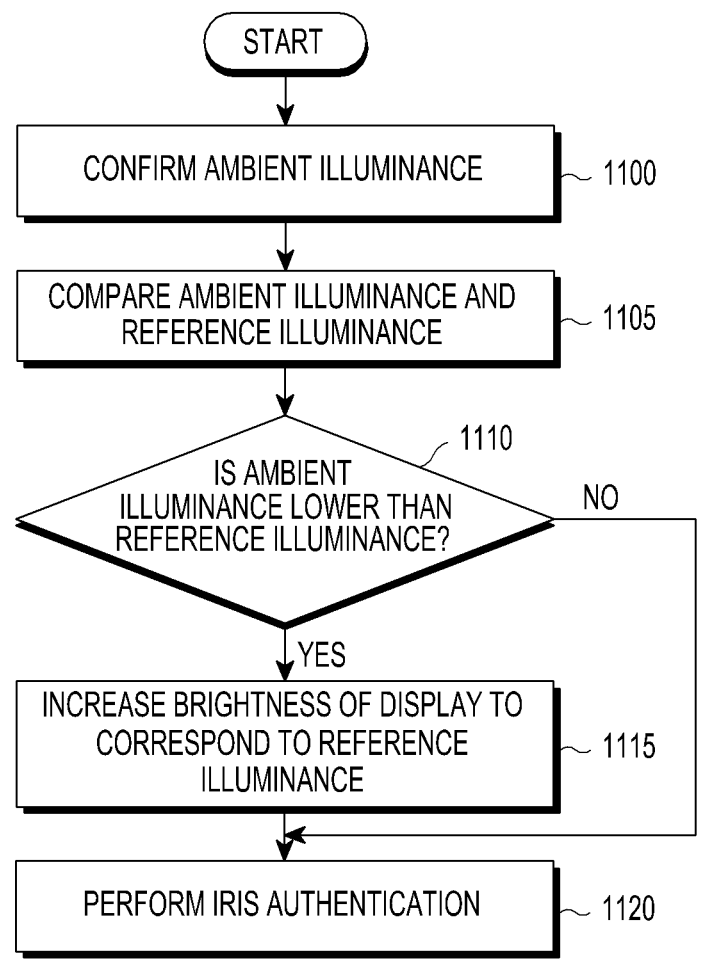
FIG. 11 is a view for explaining a display brightness adjustment process in accordance with ambient illuminance according to various embodiments of the present invention.

FIG. 11 is a view for explaining a display brightness adjustment process in accordance with ambient illuminance according to various embodiments of the present invention.

Referring to FIG. 11, the electronic device 101 may confirm ambient illuminance in operation 1100, and may then compare the ambient illuminance and a reference illuminance in operation 1105. The electronic device 101 may include a sensor unit that can receive ambient light to measure the ambient illuminance. The sensor unit may include at least one of an illuminance sensor and an image sensor. Accordingly, the electronic device 101 may measure the ambient illuminance using the sensor unit. For example, the illuminance sensor may calculate an illuminance index by receiving ambient light, and the image sensor may acquire an image and detect an ambient illumination value from the acquired image.

Next, in operation 1110, the electronic device 101 may determine whether the ambient illuminance is lower than the reference illuminance. That is, by comparing the measured ambient illuminance and the reference illuminance using the sensor unit, the electronic device 101 may determine whether the currently measured ambient illuminance corresponds to illuminance in a dark state. The reference illuminance may be determined according to ambient average brightness, illumination values of previously photographed peripheral images, an illumination value proportional to a change in the size of the pupil, etc., may be default illuminance specified by a manufacturer, or may be determined by an authorized user.

When the ambient illuminance is lower than the reference illuminance, the electronic device 101 may increase the brightness of the display to correspond to the reference illuminance in operation 1115. In other words, when the surroundings are dark, the brightness of the display may be adjusted to be brighter. At this time, the brightness of the display may be adjusted to correspond to the reference illuminance, and in particular, brightness variation may be determined based on a previously stored brightness—adjusting algorithm. For example, the brightness of the display may be adjusted to correspond to a relative size ratio of the pupil to the iris region. To this end, it is possible to refer to data stored in advance for an average pupil size ratio and a brightness value of the display corresponding to the average pupil size ratio. Accordingly, the electronic device 101 may compare a pupil size ratio calculated by analyzing the acquired image and the stored average pupil size ratio, thereby determining a display brightness adjustment amount.

Meanwhile, in order to adjust the brightness of the display, the electronic device 101 may adjust the brightness by directly adjusting the current entering the display 370 such as an LCD or an LED. However, the brightness may be adjusted using at least one parameter of a brightness, a chroma, and a contrast of an image displayed on a display screen. According to an embodiment, when the ambient illuminance is lower than the reference illuminance, that is, when the surroundings are dark, an image displayed on the display screen may be changed and displayed. According to an embodiment, when the image displayed on the display screen is a color image, the color image may be changed to a black-and-white image having relatively high brightness and may then be displayed. According to an embodiment, when the image displayed on the display screen is an image having low chroma, the image having low chroma may be changed to an image having relatively high chroma and may then be displayed.

Meanwhile, when the ambient illuminance is not lower than the reference illuminance, that is, when the surrounding brightness is brighter than the average brightness, the pupil size is relatively small so that an image including the iris region having a size required for iris recognition may be obtained. In addition, after the brightness of the display is adjusted to be brighter because the ambient illuminance is lower than the reference illuminance, the pupil size is relatively reduced according to the brightness of the display, so that an image including the iris region having the size required for iris recognition may be obtained. Accordingly, when the ambient illuminance is not lower than the reference illuminance in operation 1110 or after the brightness of the display is adjusted in operation 1115, the electronic device 101 may perform iris recognition in operation 1120. Here, the iris recognition may refer to a series of processes such as detecting the iris region from an image obtained by photographing a user's eye, generating feature pattern data, and then comparing the generated feature pattern data and a registered iris pattern for matching. By performing iris recognition in this manner, it is possible to determine whether a user is authenticated.

As described above, by adjusting the pupil size of the user using the brightness of the display in an environment with a low illumination value, it is possible to obtain the image including the iris region having the size required for iris recognition, and to improve an iris recognition rate by performing iris recognition using the obtained image.

Figure 12:
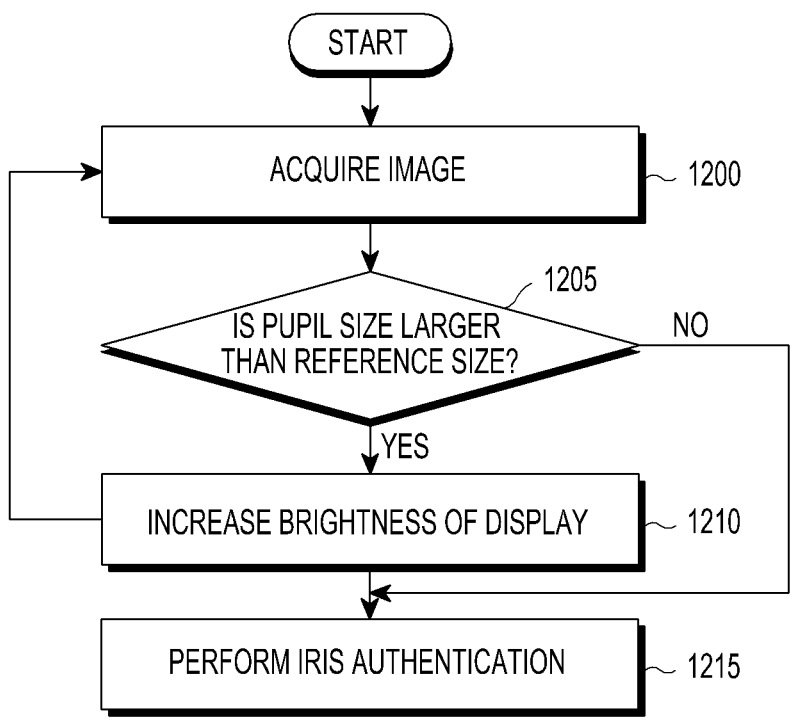
FIG. 12 is a view for explaining a display brightness adjustment process for adjusting a pupil size according to various embodiments of the present invention.

FIG. 12 is a view for explaining a display brightness adjustment process for adjusting a pupil size according to various embodiments of the present invention. Referring to FIG. 12, in the state in which a user looks toward the screen of the electronic device 101, when the electronic device 101 acquires an image obtained by photographing a user's eye in units of frames in operation 1200, the acquired image may be analyzed, and whether a pupil size is larger than a reference size in operation 1205 may be determined. At this time, the pupil size is larger than the reference size, which means that the iris is contracted and the pupil becomes larger because the surroundings are darker than normal average brightness. Therefore, in order to acquire sufficient iris data for iris authentication, it is necessary to relax the iris to make the pupil small.

Thus, when the pupil size is larger than the reference size in operation 1205, the electronic device 101 may increase the brightness of the display in operation 1210. In this manner, after increasing the brightness of the display, the electronic device 101 may return to operation 1200 and acquire the next image again. That is, after increasing the brightness of the display, the electronic device 101 may acquire an image in which the iris of the user looking at the electronic device 101 has been relaxed and the pupil has become smaller.

On the other hand, when the pupil size is not larger than the reference size, the pupil size may correspond to the image including the iris region having the size required for iris recognition in operation 1215, so that iris recognition may be performed by analyzing the obtained image. That is, the pupil and iris region may be extracted from the eye image, and feature data to be used for iris recognition may be extracted based on pupil and iris region extraction information, thereby performing recognition. In this manner, by increasing the brightness of the display, the pupil size of the user may be reduced so that the iris recognition rate may be improved.

Figure 13:
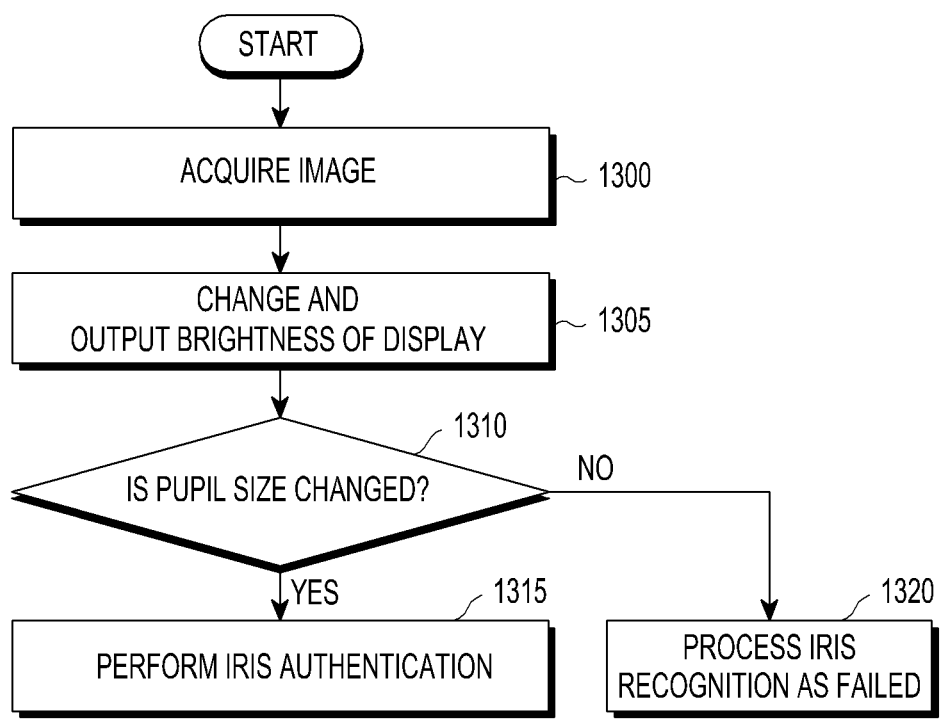
FIG. 13 is a view for explaining a display brightness adjustment process for a liveness check according to various embodiments of the present invention.

FIG. 13 is a view for explaining a display brightness adjustment process for a liveness check according to various embodiments of the present invention. FIG. 13 illustrates an operation of performing a liveness check to determine whether a photographed face image is an artificially manipulated image. Here, liveness may be used to indicate distinction between a living person and an inanimate object (e.g., an image used in counterfeiting or similar).

Referring to FIG. 13, the electronic device 101 may acquire an image in units of frames in operation 1300, and may change display brightness to output the changed display brightness in operation 1305. Next, in operation 1310, the electronic device 101 may determine whether a pupil size is changed based on the acquired image. In the case of a living person, the pupil size is changed because the iris is relaxed or contracts in response to a change in the display brightness, but in the case of an inanimate object, there is no change in the pupil size. Accordingly, the electronic device 101 according to various embodiments of the present invention may determine that the photographed face image is an image of an actual living person in operation 1310 when the pupil size is changed in response to the change in the display brightness, and perform iris recognition in operation 1315. On the other hand, when the pupil size is not changed in response to the change in the display brightness, the electronic device 101 may process the iris recognition as failed in operation 1320, and inform a user of the failure result through a screen or a speaker. Accordingly, when the user is not a registered user, for example, when the user is a user for whom iris authentication has failed, the use of the electronic device 101 may be restricted.

Figure 14:
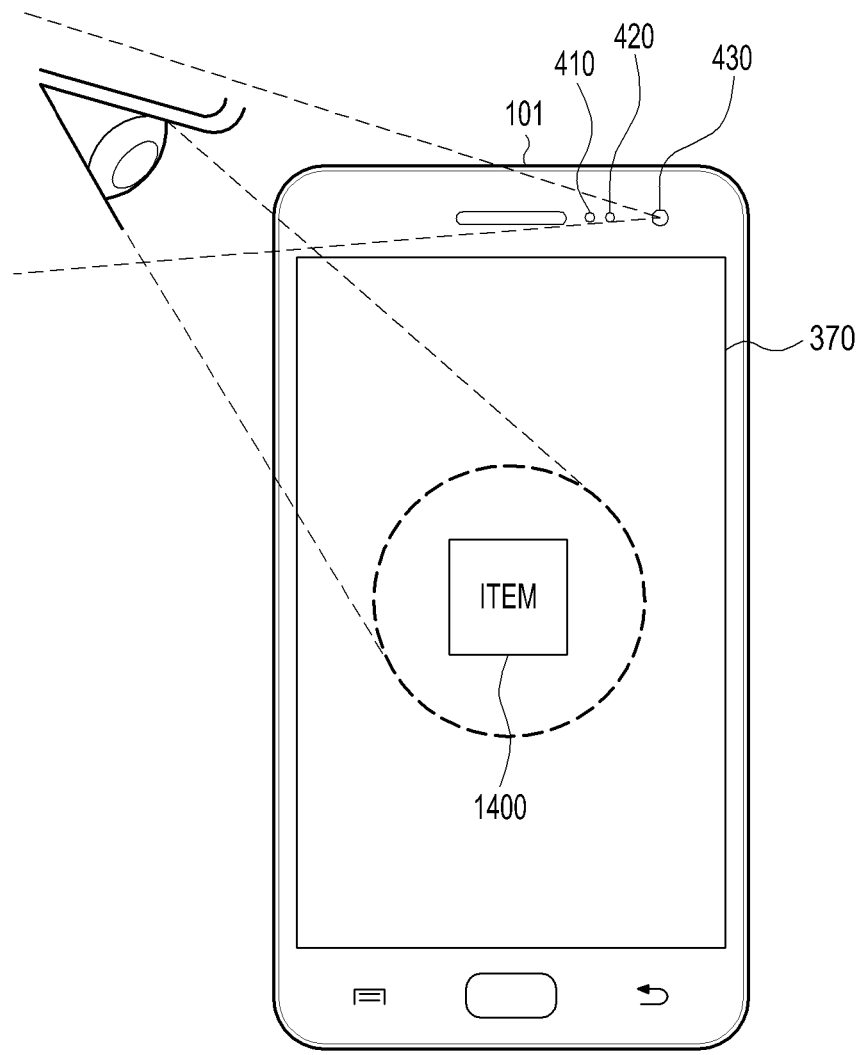
FIG. 14 is a view for explaining an authentication method using an object on a display screen according to various embodiments of the present invention.

FIG. 14 is a view for explaining an authentication method using an object on a display screen according to various embodiments of the present invention.

Referring to FIG. 14, when a user looks at an item 1400 of a screen of the display 370, a camera module including at least one of the infrared light-emitting unit 410 (e.g., IRED), the infrared camera (iris camera) 420, and the front camera 430 may be arranged at a bezel position surrounding the display 370 of the electronic device 101. The infrared light-emitting unit 410 (e.g., IRED) provided in the electronic device 101 may irradiate an eye of a user's face with infrared rays, and the infrared camera 420 may photograph the eye and output an image of the iris.

The electronic device 101 may authenticate whether a corresponding user is a user registered in the electronic device 101 based on the image input from the infrared camera 420. To this end, the electronic device 101 may perform iris recognition based on the input image. At this time, according to various embodiments of the present invention, iris authentication may be performed using at least one color displayed on the screen of the display 370 or an image in which at least one item 1400 is disposed. The electronic device 101 may store item or color information together with the iris information of the user, and utilize the stored information at the time of iris authentication.

Figure 15C:
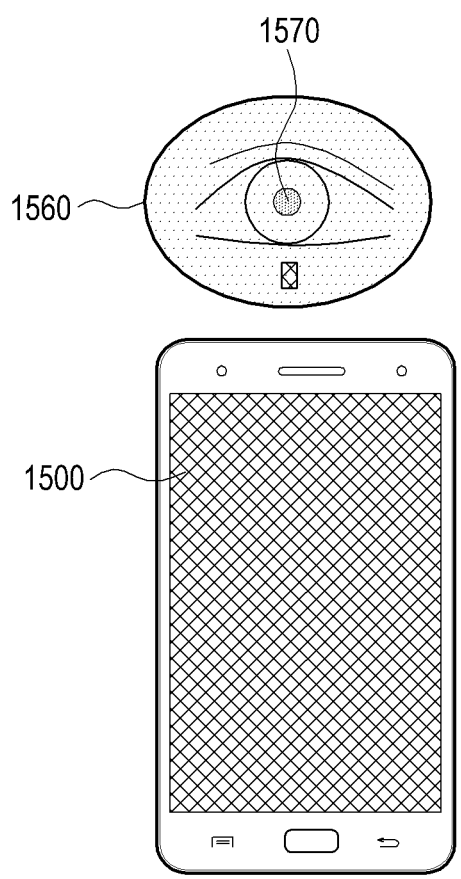

FIGS. 15A to 15C are views for explaining iris image changes in accordance with display screens including objects according to various embodiments of the present invention.

Referring to FIG. 15A, in the state in which a user looks at a screen 1500 on which an image having a specific color is displayed, an image 1510 having the specific color may be reflected on a user's pupil. Thus, according to various embodiments of the present invention, the electronic device 101 may register iris information together with the image 1510 having the specific color when registering the iris information from an acquired eye image. In this case, the user may start photographing after displaying the image having the specific color on the screen at the time of iris authentication. Accordingly, when the user attempts to perform iris authentication without displaying the image having the specific color on the screen, the iris authentication attempt may be regarded as an unintended iris authentication attempt so that the iris authentication may be processed as failed.

In FIG. 15B, in the case of a screen 1520 on which an image including an object 1530 is displayed, the image including the object 1530 may be reflected on a user's pupil. Here, the object (or an item) may be displayed on the display 370. The object (or an item) may be displayed in the form of a graphic, a shape, etc., and includes at least one of shortcut icons for executing an application, widgets, and icons representing documents of a specific file format.

FIG. 15C, when a user looking at the screen 1500 on which an image having a specific color is displayed is wearing glasses 1560, the image having the specific color may be reflected on the glasses 1560 instead of a pupil 1570 and may thus be displayed. In this case, the image having the specific color may be registered together with the iris information from the acquired eye image, and there may be a portion where a difference in the position in which the image is detected is generated due to the reflected image on the glasses, and therefore the image having the specific color may be used after correction treatment.

Figure 16:
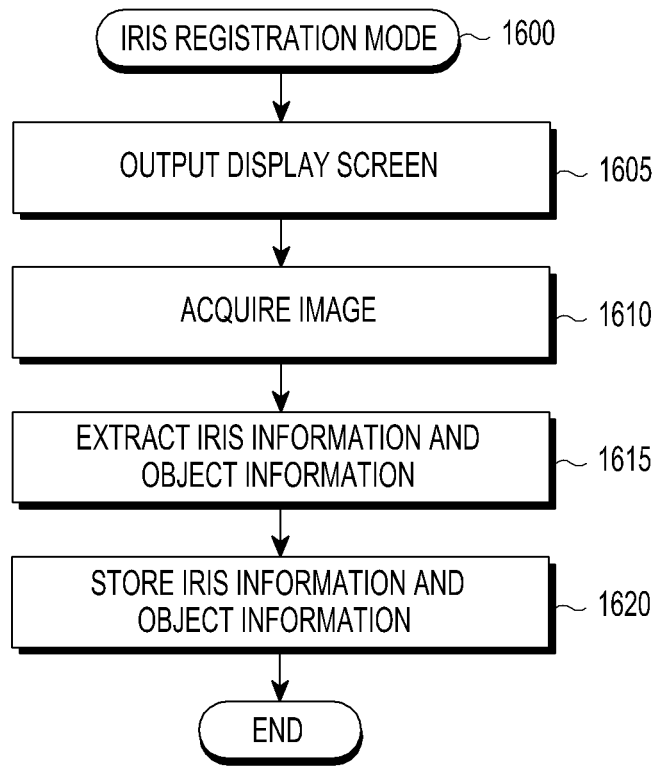
FIG. 16 is a view for explaining an iris registration mode according to various embodiments of the present invention.

FIG. 16 is a view for explaining an iris registration mode according to various embodiments of the present invention.

Referring to FIG. 16, when entering an iris registration mode in operation 1600, the electronic device 101 may output a display screen as shown in, for example, FIGS. 15A to 15C in operation 1605. Next, the electronic device 101 may acquire an eye image on which a color or an object displayed on the display screen is reflected in operation 1610, and may extract iris information and object information from the acquired image in operation 1615. In operation 1620, the electronic device 101 may store the extracted iris information and object information in the memory 380. At this time, a user may map an arbitrary application on the object information and stored the mapped information.

Figure 17:
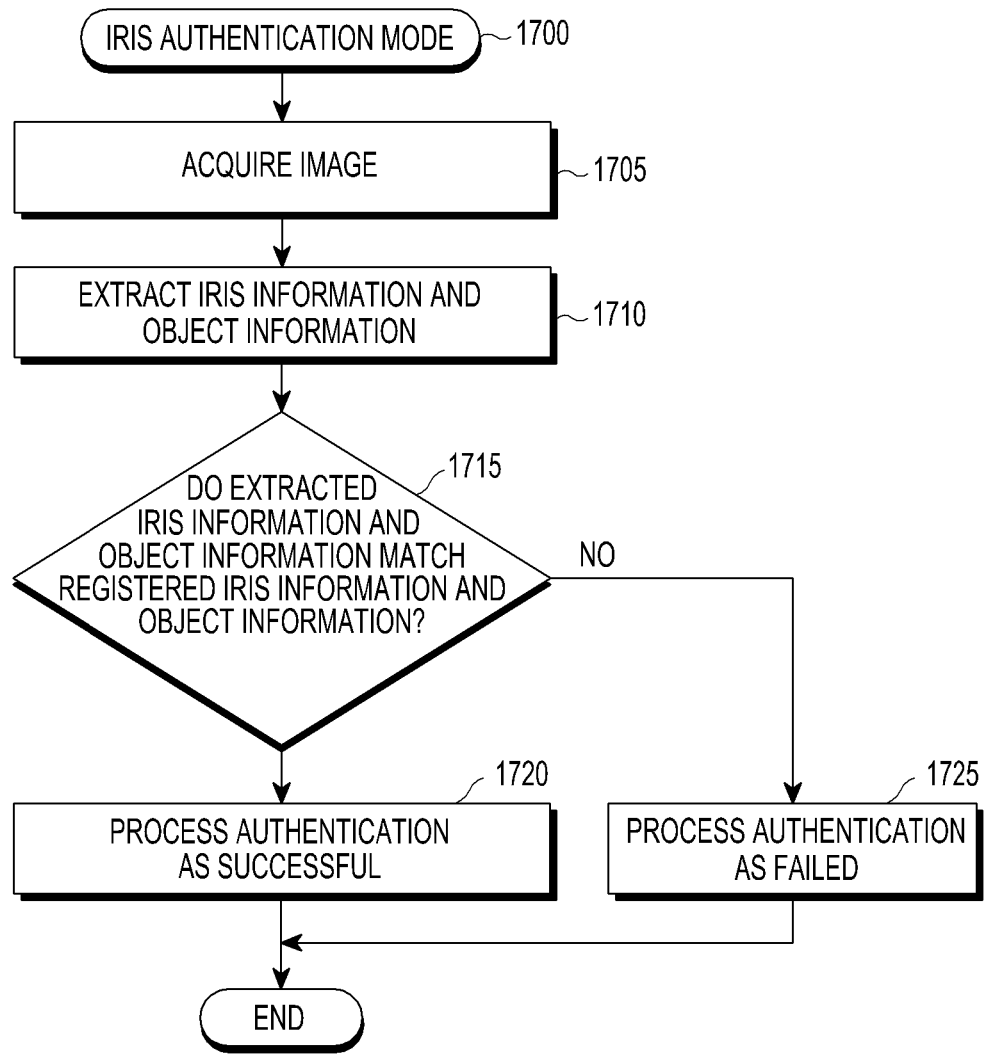
FIG. 17 is a view for explaining an iris authentication mode according to various embodiments of the present invention.

FIG. 17 is a view for explaining an iris authentication mode according to various embodiments of the present invention.

Referring to FIG. 17, in operation 1700, the electronic device 101 may output a screen for iris authentication when entering an iris authentication mode. For example, as shown in FIGS. 15A to 15C, the electronic device 101 may acquire an image obtained by photographing a user's eye region in operation 1705 in the state of outputting an iris authentication screen. In operation 1710, the electronic device 101 may extract iris information and object information by analyzing the acquired image. Next, in operation 1715, the electronic device 101 may determine whether the extracted iris information and object information coincide with registered iris information and object information. When the extracted iris information and object information coincide with the registered iris information and object information, the electronic device 101 may process the iris authentication as successful in operation 1720. Accordingly, when the iris authentication is successful, the electronic device 101 may execute functions such as unlocking, application execution, data transmission, etc., and the display 370 may display a screen corresponding to the function execution. However, when the extracted iris information and object information do not coincide with the registered iris information and object information, the electronic device 101 may process the iris authentication as failed in operation 1725, so that the use of the electronic device 101 may be restricted.

Figure 18:
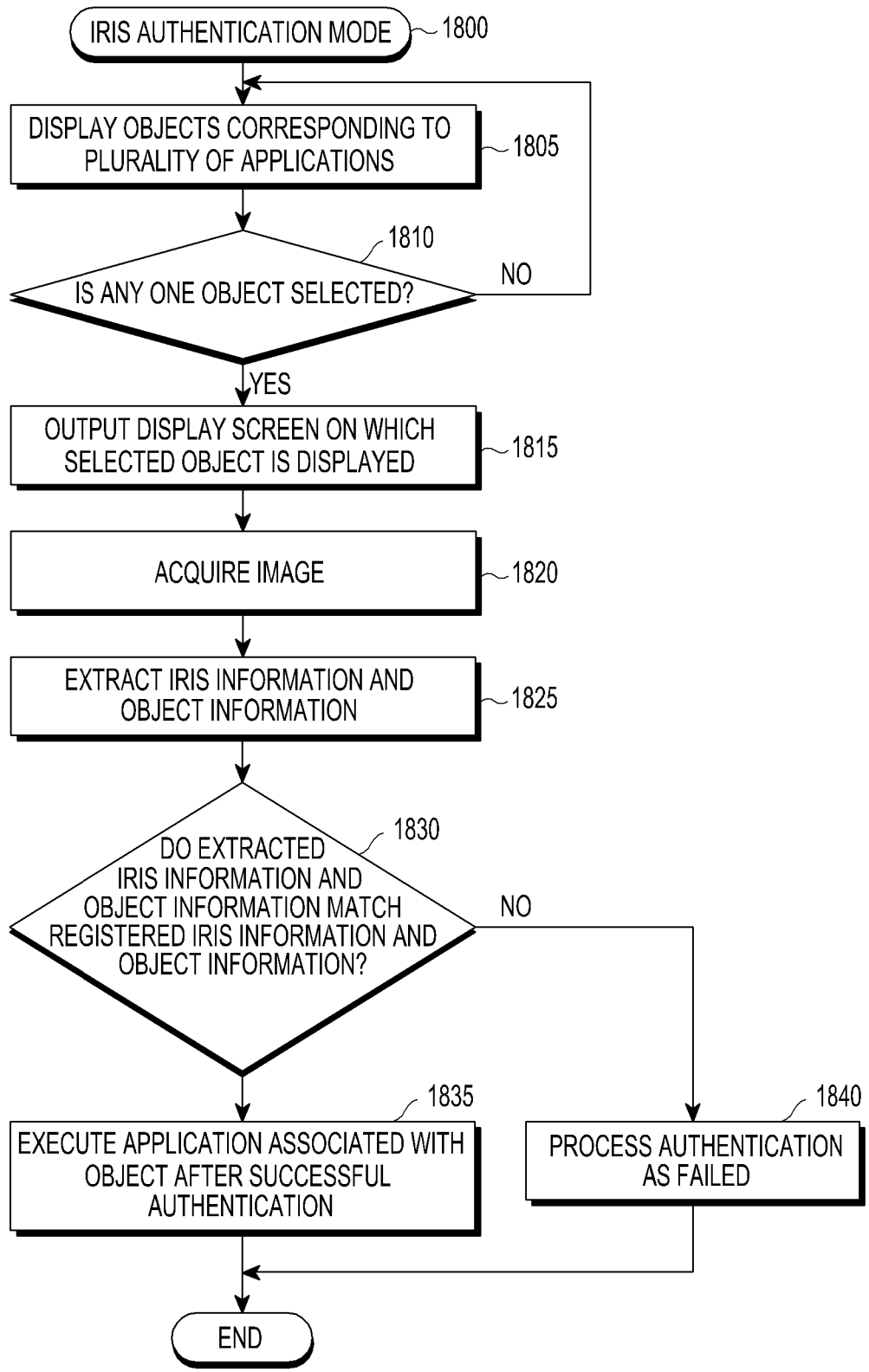
FIG. 18 is a view for explaining an object executing process after performing iris authentication according to various embodiments of the present invention.

FIG. 18 is a view for explaining an object executing process after performing iris authentication according to various embodiments of the present invention.

Referring to FIG. 18, in operation 1800, the electronic device 101 may output a screen for iris authentication when entering an iris authentication mode. In operation 1805, the electronic device 101 may display objects corresponding to a plurality of applications on the screen for iris authentication. At this time, the object may have a form associated with the application so that a user may identify the application associated with the object.

For example, the object displayed on the screen for iris authentication may represent an arbitrary executable application. For example, the object displayed on the screen for iris authentication may be an SNS application, a telephone application, a message application, a schedule management application, a document creation application, a music application, an Internet application, a map application, a camera application, an e-mail application, a photo application, an image editing application, a search application, a file search application, a video application, a game application, or the like. The type of object displayed on the screen for iris authentication may be changed according to a user's setting.

Next, in operation 1810, the electronic device 101 may determine whether any one of the objects is selected. When any one of the objects is selected, the electronic device 101 may output a display screen on which the selected object is displayed in operation 1815, and may acquire an image obtained by photographing a user's eye region in operation 1820. Next, the electronic device 101 may extract iris information and object information from the acquired image in operation 1825, and may determine whether the extracted iris information and object information coincide with registered iris information and object information in operation 1830. That is, whether the extracted iris information and object information match the registered iris information and object information may be determined.

When the extracted iris information and object information coincide with registered iris information and object information, the electronic device 101 may execute the application associated with the object after successful authentication in operation 1835. On the other hand, when the extracted iris information and object information do not coincide with registered iris information and object information, the electronic device 101 may process the iris authentication as failed in operation 1840, so that the use of the electronic device 101 may be restricted.

Figure 19:
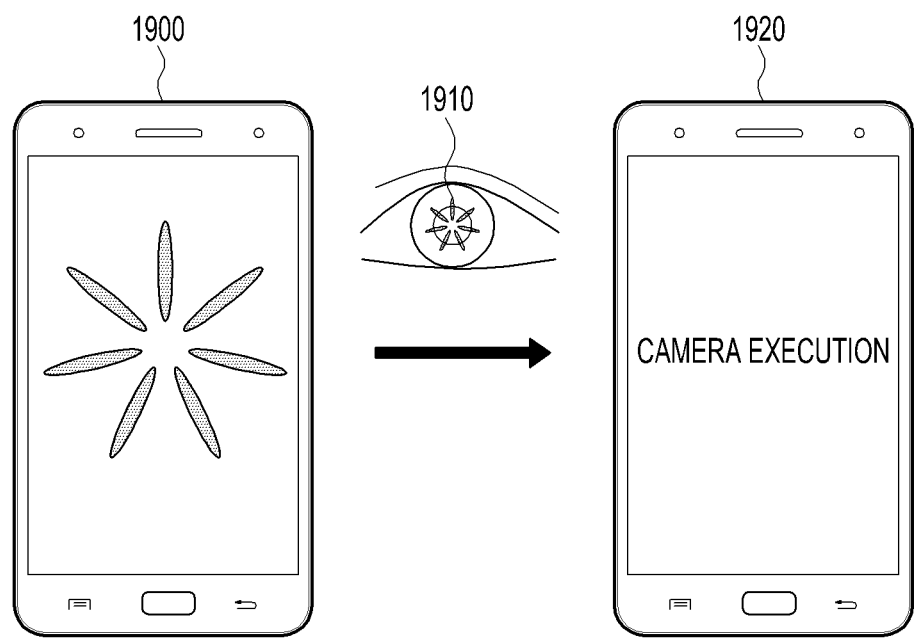
FIG. 19 is an exemplary view showing an object execution screen after performing authentication in a display screen on which an object is displayed according to various embodiments of the present invention.

FIG. 19 illustrates an object execution screen after performing authentication in a display screen on which an object is displayed according to various embodiments of the present invention.

In the state in which a screen 1900 for iris authentication displaying an object having the shape shown in FIG. 19 is shown, an object having the same shape may be reflected on the pupil 1910 of the user. In the case in which the electronic device 101 acquires an iris image including the object having the same shape, when authentication based on the iris image is successful, a screen 1920 executing the application associated with the object, for example, a camera, is illustrated.

Specifically, in the case in which iris registration is performed in the state in which a first shape is displayed so that a user may perform a first function on the display 370, when the iris authentication is successful, the first function corresponding to the first shape may be performed. In addition, in the case in which iris registration is performed in the state in which a second shape is displayed so that a user may perform a second function on the display 370, when the iris authentication is successful, the second function, corresponding to the second shape, may be performed.

As described above, the user may map an application to be executed on each of a plurality of objects and store the mapped information, and may store the object and the iris information of the user together at the time of the iris registration. In addition, in FIG. 19, the case in which the object displayed on the screen for iris authentication is selected directly by a user has been described, but the object displayed on the screen for iris authentication may be changed by a manufacturer or an authorized user. As described above, according to various embodiments of the present invention, theft of the electronic device 101 by a third party may be prevented to maintain security, and a user may directly enter a desired function, thereby providing a user interface that is convenient for the user to use.

Figure 20:
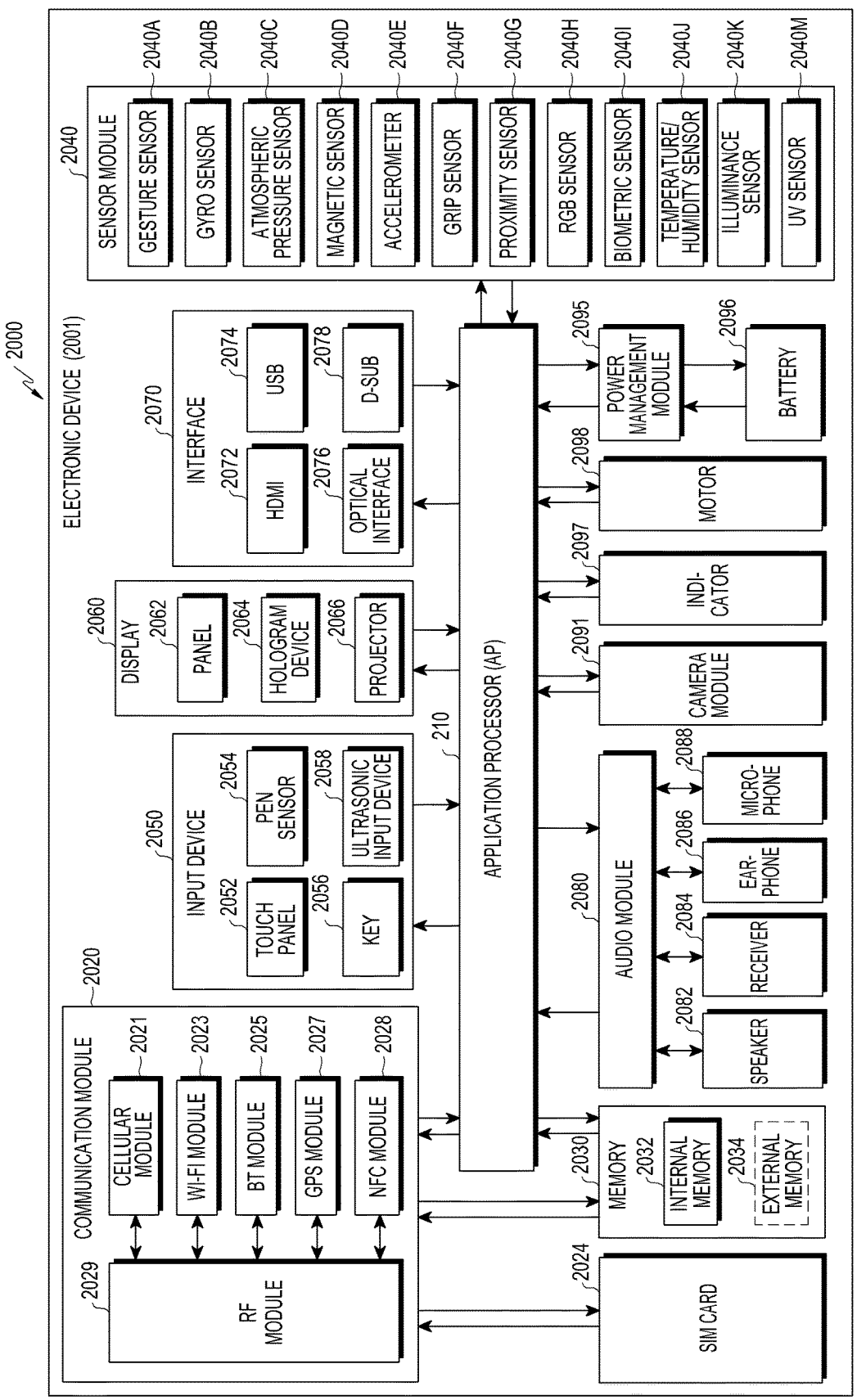
FIG. 20 is a block diagram of an electronic device according to various embodiments of the present invention.

FIG. 20 is a block diagram 2000 of an electronic device 2001 according to various embodiments of the present invention.

The electronic device 2001 may include all or a part of, for example, the electronic device 101 shown in FIG. 1. The electronic device 2001 may include at least one AP 2010, a communication module 2020, an SIM (subscriber identification module) card 2024, a memory 2030, a sensor module 2040, an input device 2050, a display 2060, an interface 2070, an audio module 2080, a camera module 2091, a power management module 2095, a battery 2096, an indicator 2097, and a motor 2098.

The AP 2010 may drive, for example, an OS or an application to control a plurality of hardware or software components connected to the AP 2010, and execute processing and operations of a variety of data. The AP 2010 may be implemented as, for example, a SoC (system on chip). According to an embodiment, the AP 2010 may further include a GPU (Graphic Processing Unit) and/or an image signal processor. The AP 2010 may include at least a part (e.g., a cellular module 2021) of the components shown in FIG. 20. The AP 2010 may load a command or data received from at least one of other components (e.g., a non-volatile memory) to a volatile memory, and may store a variety of data in the non-volatile memory.

The communication module 2020 may have a configuration identical or similar to that of the communication interface 170 of FIG. 1. The communication module 2020 may include, for example, the cellular module 2021, a Wi-Fi module 2023, a BT module 2025, a GPS module 2027, an NFC module 2028, and an RF (Radio Frequency) module 2029.

The cellular module 2021 may provide, for example, a voice call, a video call, an SMS service, an Internet service, and the like via a communications network. According to an embodiment, the cellular module 2021 may identify and authenticate the electronic device 2001 in a communication network by using a subscriber identification module (e.g., the SIM card 2024). According to an embodiment, the cellular module 2021 may perform at least some of functions that can be provided by the AP 2010. According to an embodiment, the cellular module 2021 may include a CP (communication processor).

Each of the Wi-Fi module 2023, the BT module 2025, the GPS module 2027, or the NFC module 2028 may include, for example, a processor for processing data transmitted and received via the corresponding module. According to some embodiments, at least some (e.g., two or more) of the cellular module 2021, the Wi-Fi module 2023, the BT module 2025, the GPS module 2027, and the NFC module 2028 may be included in a single IC (integrated chip) or an IC package.

The RF module 2029 may transmit and receive, for example, a communication signal (e.g., RF signal). The RF module 2029 may include, for example, a transceiver, a PAM (power amp module), a frequency filter, an LNA (low noise amplifier), an antenna, or the like. According to another embodiment, at least one of the cellular module 2021, the Wi-Fi module 2023, the BT module 2025, the GPS module 2027, and the NFC module 2028 may transmit and receive the RF signal via a separate RF module 2029.

The SIM card 2024 may include, for example, a card and/or embedded SIM including a subscriber identification module, unique identification information (e.g., ICCID (integrated circuit card identifier)), or subscriber information (e.g., IMSI (international mobile subscriber identity)).

The memory 2030 (e.g., the memory 130) may include, for example, an internal memory 2032 or an external memory 2034. The internal memory 2032 may include at least one of, for example, a volatile memory (e.g., DRAM (dynamic RAM), SRAM (static RAM), SDRAM (Synchronous Dynamic RAM), or the like) and a non-volatile memory (e.g., OTPROM (one time programmable ROM), PROM (programmable ROM), EPROM (erasable and programmable ROM), EEPROM (electrically erasable and programmable ROM), mask ROM, flash ROM, flash memory (e.g., NAND flash, NOR flash, or the like), a hard drive, or an SSD (solid state drive)).

The external memory 2034 may further include a flash drive, for example, CF (compact flash), SD (secure digital), Micro-SD (micro secure digital), Mini-SD (mini secure digital), xD (extreme digital), a memory stick, or the like. The external memory 2034 may be functionally and/or physically connected to the electronic device 2001 through a variety of interfaces.

The sensor module 2040 may measure, for example, a physical quantity or sense an operation state of the electronic device 2001, and may convert the measured or sensed information into an electrical signal. The sensor module 2040 may include, for example, a gesture sensor 2040A, a gyro sensor 2040B, an atmospheric pressure sensor 2040C, a magnetic sensor 2040D, an accelerometer 2040E, a grip sensor 2040F, a proximity sensor 2040G, a color sensor (e.g., RGB (red, green, blue) sensor) 2040H, a biometric sensor 20401, a temperature/humidity sensor 2040J, an illuminance sensor 2040K, and an UV (ultra violet) sensor 2040M. Additionally or alternatively, the sensor module 2040 may include, for example, an E-nose sensor, an EMG (electromyography) sensor, an EEG (electroencephalogram) sensor, an ECG (electrocardiogram) sensor, an IR (infrared) sensor, an iris sensor, and/or a fingerprint sensor. The sensor module 2040 may further include a control circuit for controlling one or more sensors included therein. According to some embodiments, the electronic device 2001 may further include a processor configured to control the sensor module 2040 as a part of or separately from the AP 2010, and thereby control the sensor module 2040 while the AP 2010 is in a sleep state.

The input device 2050 may include, for example, a touch panel 2052, a (digital) pen sensor 2054, a key 2056, or an ultrasonic input device 2058. The touch panel 2052 may use at least one of, for example, a capacitive method, a decompression method, an infrared method, and an ultrasonic method. In addition, the touch panel 2052 may further include a control circuit. The touch panel 2052 may further include a tactile layer, and provide a tactile response to a user.

The (digital) pen sensor 2054 may include, for example, a sheet for recognition which is a part of or separate from the touch panel 2052. The key 2056 may include, for example, a physical button, an optical key, or a keypad. The ultrasonic input device 2058 may detect sound waves using a microphone (e.g., a microphone 2088) and identify data in the electronic device 2001, through an input tool that generates an ultrasonic signal.

The display 2060 (e.g., the display 160) may include a panel 2062, a hologram device 2064, or a projector 2066. The panel 2062 may include, for example, a configuration identical or similar to that of the display 160 of FIG. 1. The panel 2062 may be implemented to be, for example, flexible, transparent, or wearable. The panel 2062 may constitute one module together with the touch panel 2052. The hologram device 2064 may show a three-dimensional (3D) image in the air by using light interference. The projector 2066 may display an image by projecting light onto a screen. The screen may be located, for example, inside or outside the electronic device 2001. According to an embodiment, the display 2060 may further include a control circuit for controlling the panel 2062, the hologram device 2064, or the projector 2066.

The interface 2070 may include, for example, an HDMI (high-definition multimedia interface) 2072, a USB (universal serial bus) 2074, an optical interface 2076, or a D-sub (D-subminiature) 2078. The interface 2070 may be included in, for example, the communication interface 170 shown in FIG. 1. Additionally or alternatively, the interface 2070 may include an MHL (mobile high-definition link) interface, an SD card/MMC (multi-media card) interface, or an IrDA (infrared data association) standard interface.

The audio module 2080 may bidirectionally convert sound and electrical signals. At least some components of the audio module 2080 may be included in, for example, the I/O interface 150 shown in FIG. 1. The audio module 2080 may process sound information input or output by, for example, a speaker 2082, a receiver 2084, earphones 2088, or the microphone 2088.

The camera module 2091 may be a device that can take, for example, still and moving images, and according to an embodiment may include one or more image sensors (e.g., a front sensor or a rear sensor), a lens, an ISP (image signal processor), or a flash (e.g., LED or xenon lamp).

The power management module 2095 may manage, for example, the power supply of the electronic device 2001. According to an embodiment, the power management module 2095 may include a PMIC (power management integrated circuit), a charger IC, or a battery or fuel gauge. The PMIC may have a wired and/or wireless charging method. The wireless charging method may include, for example, a magnetic resonance charging method, a magnetic induction charging method, or an electromagnetic wave method, and may further include an additional circuit for wirelessly charging, for example, a coil loop, a resonance circuit, a rectifier, or the like. The battery gauge may measure, for example, a residual capacity, a charge voltage, a current, or a temperature of the battery 2096. The battery 2096 may include, for example, a rechargeable battery and/or a solar battery.

The indicator 2097 may display a specific state of the electronic device 2001 or a part thereof (e.g., the AP 2010), for example, a boot-up state, a message state, or a charging state. The motor 2098 may convert an electrical signal into a mechanical vibration, and generate vibration or haptic effects. Although not shown, the electronic device 2001 may include a processing device (e.g., GPU) for supporting a mobile TV. The processing device for supporting the mobile TV may process, for example, media data according to the standard of DMB (digital multimedia broadcasting), DVB (digital video broadcasting), or media flow.

Each of the above-described components of the electronic device 2001 may be configured by one or more components and the name of the corresponding component may vary depending on the type of the electronic device 2001. In various embodiments, the electronic device 2001 may include at least one of the above-described components. Some of the above-described components may be omitted from the electronic device 2001, or the electronic device 2001 may further include additional components. Further, some of the components of the electronic device 2001 according to various embodiments may be coupled to form a single entity, thereby performing the same functions as those of the corresponding components before the coupling.

The "module" used in various embodiments of the present invention may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

It will be appreciated that the exemplary embodiments of the present invention may be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It is appreciated that the storage unit included in the electronic device is one example of the machine-readable storage media suitable for storing a program or programs including commands for implementing various embodiments of the present invention. Accordingly, the present invention includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present invention appropriately includes equivalents of the program.

In addition, the electronic device may receive and store the program from a program-providing device connected in a wired or wireless manner. The program providing device may include a program including instructions for performing a method of performing iris authentication using the display of the electronic device, a memory for storing information necessary for a method of performing iris authentication using the display of the electronic device, a communication unit for performing wired or wireless communication with the electronic device, and a control unit for transmitting the corresponding program to the electronic device in response to a request from the electronic device or automatically.

Although specific embodiments are described in the above description of the present invention, various modifications can be made without departing from the scope of the present invention. Therefore, the scope of the present invention cannot be determined merely on the basis of the described embodiments. Rather, the scope of the present invention should be determined on the basis of the accompanying claims and their equivalents.

The invention claimed is:

1. An electronic device for performing iris authentication, comprising:
    an image sensor;
    a display; and
    a control unit, comprising a processor configured to:
        display an object on the display;
        obtain at least a first partial region from an eye image obtained through the image sensor;
        adjust output characteristics of the display based on a result obtained based on a size of the at least the first partial region and a size of a region required for iris authentication;
        obtain at least a second partial region from another eye image obtained through the image sensor after the output characteristics of the display are adjusted; and
        perform the iris authentication by using an iris image included in the at least the second partial region and an object image that corresponds to the object displayed on the display and is included in the at least the second partial region.

2. The electronic device as claimed in claim 1, wherein the output characteristics of the display include a brightness of the display.

3. The electronic device as claimed in claim 1, wherein the control unit is configured to adjust the output characteristics of the display by changing at least one of a brightness, a chroma, and a contrast of an image displayed on the display.

4. The electronic device as claimed in claim 1, wherein the at least the first partial region includes a pupil region and an iris region of the eye image.

5. The electronic device as claimed in claim 4, wherein the control unit is configured to, when a size of the pupil region is larger than the size of the region required for the iris authentication, increase a brightness of the display.

6. The electronic device as claimed in claim 5, wherein the control unit is configured to, when the size of the pupil region is larger than the size of the region required for the iris authentication, increase brightness of the display to correspond to a ratio of the size of the pupil region to a size of the iris region.

7. The electronic device as claimed in claim 1, wherein the control unit is configured to determine whether there is a change in a pupil size of the other eye image by adjusting the output characteristics of the display, and determine iris authentication failure when there is no change in the pupil size.

8. The electronic device as claimed in claim 1, further comprising:
    a memory configured to store object information displayed on a screen at a time of iris registration of a user together with iris information of the user, and map and store an application to be executed on an object corresponding to the object information.

9. The electronic device as claimed in claim 8, wherein the control unit is configured to extract iris information and object information from the other eye image, and then execute an application corresponding to the object information when the extracted iris information and object information match registered iris information and object information.

10. The electronic device as claimed in claim 1, wherein the control unit is configured to determine whether ambient illumination is lower than a threshold illumination using an ambient illumination sensor, and adjust the output characteristics of the display when the ambient illumination is lower than the threshold illumination.

11. A method of performing iris authentication in an electronic device, comprising:
   displaying an object on a display;
   obtaining at least a first partial region from an eye image obtained through an image sensor;
   adjusting output characteristics of the display based on a result obtained based on a size of the at least the first partial region and a size of a region required for iris authentication;
   obtaining at least a second partial region from another eye image obtained through the image sensor after the output characteristics of the display are adjusted; and
   performing the iris authentication by using an iris image included in the at least the second partial region and an object image that corresponds to the object displayed on the display and is included in the at least the second partial region.

12. The method as claimed in claim 11, wherein the output characteristics of the display include a brightness of the display.

13. The method as claimed in claim 11, wherein the adjusting output characteristics of the display includes changing at least one of a brightness, a chroma, and a contrast of an image displayed on the display.

14. The method as claimed in claim 11, wherein the at least the first partial region includes a pupil region and an iris region of the eye image.

15. The method as claimed in claim 11, wherein the adjusting the output characteristics of the display includes increasing a brightness of the display when a size of the pupil region is larger than the size of the region required for the iris authentication.

16. The method as claimed in claim 11, further comprising:
   determining whether there is a change in a pupil size of the other eye image by adjusting the output characteristics of the display; and
   determining iris authentication failure when there is no change in the pupil size.

17. The method as claimed in claim 11, further comprising:
   extracting iris information and object information from the other eye image;
   determining whether the extracted iris information and object information match registered iris information and object information; and
   executing an application corresponding to the object information when the extracted iris information and object information match the registered iris information and object information.

18. The method as claimed in claim 11, further comprising:
   determining whether ambient illumination is lower than a threshold illumination; and
   adjusting the output characteristics of the display when the ambient illumination is lower than the threshold illumination.

* * * * *